US011658949B2

(12) United States Patent
Bastos et al.

(10) Patent No.: US 11,658,949 B2
(45) Date of Patent: May 23, 2023

(54) SECURE PUBLISH-SUBSCRIBE COMMUNICATION METHODS AND APPARATUS

(71) Applicant: BRITISH TELECOMMUNICATIONS PUBLIC LIMITED COMPANY, London (GB)

(72) Inventors: Daniel Bastos, London (GB); Fadi El-Moussa, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/766,908

(22) PCT Filed: Jun. 23, 2020

(86) PCT No.: PCT/EP2020/067502
§ 371 (c)(1),
(2) Date: Apr. 6, 2022

(87) PCT Pub. No.: WO2021/069112
PCT Pub. Date: Apr. 15, 2021

(65) Prior Publication Data
US 2022/0353247 A1 Nov. 3, 2022

(30) Foreign Application Priority Data
Oct. 7, 2019 (GB) ...................................... 1914444

(51) Int. Cl.
*H04L 9/40* (2022.01)
*H04L 9/30* (2006.01)
(52) U.S. Cl.
CPC ............ *H04L 63/0428* (2013.01); *H04L 9/30* (2013.01); *H04L 63/105* (2013.01)

(58) Field of Classification Search
CPC ...... H04L 63/0428; H04L 9/30; H04L 63/105
See application file for complete search history.

(56) References Cited

U.S. PATENT DOCUMENTS 5,724,414 A * 3/1998 Dimolitsas ............... H04K 1/00
455/12.1
5,963,621 A * 10/1999 Dimolitsas ............... H04K 1/00
379/100.17

(Continued)

FOREIGN PATENT DOCUMENTS

CN 1636377 A * 7/2005 ............. G06F 21/10
CN 107070652 8/2017

(Continued)

OTHER PUBLICATIONS

International Search Report for PCT/EP2020/067502 dated Aug. 3, 2020, 5 pages.

(Continued)

*Primary Examiner* — Yonas A Bayou
(74) *Attorney, Agent, or Firm* — Nixon & Vanderhye P.C.

(57) ABSTRACT

Improvements to publish-subscribe protocols are provided, including a method for communicating data in a network comprising publisher devices, a broker and subscriber devices, comprising one of the publisher devices: i-a. receiving a public key from the broker; i-b. determining, based on one or more attributes of data to be published to the broker, whether a sensitivity level of the data is low; and ii. following completion of both of steps i-a and i-b, publishing the data to the broker, wherein: when step i-b results in a determination that the sensitivity level of the data is low, step ii comprises transmitting the data to the broker unencrypted; and when step i-b results in a determination that the sensitivity level of the data is not low, step ii comprises encrypting the data then transmitting resulting encrypted (Continued)

data to the broker, wherein the step of encrypting the data uses the public key.

22 Claims, 20 Drawing Sheets

(56) References Cited

U.S. PATENT DOCUMENTS

| | | | |
|---|---|---|---|
| 6,158,007 A | 12/2000 | Moreh et al. | |
| 8,601,544 B1 | 12/2013 | Robinson et al. | |
| 9,379,891 B2 | 6/2016 | Yoon et al. | |
| 9,774,577 B2 | 9/2017 | Lokamathe et al. | |
| 9,888,000 B2 | 2/2018 | Seibert, Jr. et al. | |
| 10,164,983 B2 | 12/2018 | Chen et al. | |
| 10,601,960 B2* | 3/2020 | Raduchel | H04L 67/12 |
| 10,693,647 B2* | 6/2020 | Raduchel | H04L 63/102 |
| 10,838,954 B1* | 11/2020 | Santos | G10L 15/22 |
| 11,128,466 B2* | 9/2021 | Raduchel | H04L 65/403 |
| 11,399,079 B2* | 7/2022 | Raduchel | H04L 63/062 |
| 2005/0027871 A1 | 2/2005 | Bradley et al. | |
| 2012/0226906 A1* | 9/2012 | Machani | H04L 63/061 |
| | | | 713/168 |
| 2013/0232542 A1 | 9/2013 | Cheng et al. | |
| 2014/0189834 A1 | 7/2014 | Metke | |
| 2014/0372748 A1* | 12/2014 | Dixon | H04L 9/3247 |
| | | | 713/153 |
| 2015/0324593 A1* | 11/2015 | Abuelsaad | H04L 63/168 |
| | | | 726/26 |
| 2016/0112438 A1 | 4/2016 | Hengstler et al. | |
| 2016/0269418 A1 | 9/2016 | Sangary et al. | |
| 2018/0027128 A1 | 1/2018 | Balakrishnan et al. | |
| 2018/0083935 A1 | 3/2018 | Fang et al. | |
| 2018/0115523 A1 | 4/2018 | Subbarayan et al. | |
| 2018/0167476 A1* | 6/2018 | Hoffner | H04L 67/55 |
| 2018/0183789 A1 | 6/2018 | Tischart et al. | |
| 2018/0248804 A1 | 8/2018 | Nandy et al. | |
| 2018/0262524 A1 | 9/2018 | Deshpande et al. | |
| 2018/0302424 A1 | 10/2018 | Bender et al. | |
| 2018/0324671 A1 | 11/2018 | Palnati et al. | |
| 2018/0359269 A1 | 12/2018 | Caceres et al. | |
| 2019/0188278 A1 | 6/2019 | Das et al. | |
| 2019/0215694 A1* | 7/2019 | Rubin | H04L 63/1458 |
| 2019/0222594 A1 | 7/2019 | Davis, III et al. | |
| 2022/0028160 A1* | 1/2022 | Patel | G06T 15/06 |

FOREIGN PATENT DOCUMENTS

| | | | | |
|---|---|---|---|---|
| CN | 107708112 | | 2/2018 | |
| CN | 111107085 A | * | 5/2020 | H04L 63/0435 |
| EP | 3376731 | | 9/2018 | |
| GB | 2509709 | | 7/2014 | |
| KR | 10-2017-0111768 | | 10/2017 | |
| WO | 2012/107058 | | 8/2012 | |
| WO | 2017/076705 | | 5/2017 | |
| WO | 2018/190983 | | 10/2018 | |

OTHER PUBLICATIONS

Written Opinion of the ISA for PCT/EP2020/067502 dated Aug. 3, 2020, 7 pages.
Written Opinion of the IPEA for PCT/EP2020/067502 dated Apr. 30, 2021, 5 pages.
International Preliminary Report on Patentability for PCT/EP2020/067502 dated Dec. 20, 2021, 17 pages.
Combined Search and Examination Report for GB1914439.3 dated Apr. 1, 2020, 10 pages.
Combined Search and Examination Report for GB1914440.1 dated Mar. 26, 2020, 9 pages.
Search Report for GB1914444.3 dated Mar. 25, 2020, 5 pages.
CloudPub/Sub, Publishing Messages, https://cloud.google.com/pubsub/, No Date, 7 pages.
Firdous et al., "Modelling and Evaluation of Malicious Attacks against the IoT MQTT Protocol", IEEE, 2017, pp. 748-755.
Gantait et al., "Securing IoT devices and gateways", IBM, IoT Security, published May 16, 2016, 29 pages.
Lee et al., "A Work in Progress: Context based encryption scheme for Internet of Things", Procedia Computer Science, vol. 56, 2015, pp. 271-275.
Solution Brief, Secure IoT Devices to Protect Against Attacks, Feb. 2017, 8 pages.
Thatmann et al., "Applying Attribute-based Encryption on Publish Secure Messaging Patterns for the Internet of Things", IEEE Computer Society, 2015, pp. 556-563.
Singh et al., Secure MQTT for Internet of Things (IoT), IEEE Computer Society, 2015, pp. 746-751.
Touati et al., "Efficient CP-ABE Attribute/Key Management for IoT Applications", HAL, Nov. 8, 2015, 9 pages.
Nystrom RSA Security M: "The Protected One-Time Password Protocol (EAP-POTP) draft-nystrom-eap-potp-01.txt", Internet Engineering Task Force, IETF; StandardWorkingDraft, Internet Society (ISOC) 4, Rue des Falaises CH-1205 Geneva, Switzerland, No. 1, Apr. 21, 2005 (Apr. 21, 2005), XP015039509.
M'Raihi Verisign D et al: "TOTP: Time-Based One-Time Password Algorithm; rfc6238.txt", Internet Engineering Task Force, IETF; Standard, Internet Society (ISOC) 4, Rue des Falaises CH-1205 Geneva, Switzerland, May 14, 2011 (May 14, 2011), pp. 1-16, XP015076008, [retrieved on May 14, 2011].
International Preliminary Report on Patentability dated Dec. 20, 2021 issued in International Application No. PCT/EP2020/067502 (17 pages).
Office Action dated Jul. 19, 2022 issued for Chinese Application No. CN202080069408.8 (9 pages).
Examination Report and Notification of Intention to Grant under Section 18(4) for GB1914444.3 dated Jul. 15, 2022 (2 pages).
Davide Proserpio et al., "Achieving IPTV Service Portability through Delegation", IEEE Transactions on Consumer Electronics, vol. 57, No. 2, May 2011 (7 pages).

* cited by examiner

SECURE PUBLISH-SUBSCRIBE COMMUNICATION METHODS AND APPARATUS

This application is the U.S. national phase of International Application No. PCT/EP2020/067502 filed Jun. 23, 2020 which designated the U.S. and claims priority to GB 1914444.3 filed Oct. 7, 2019, the entire contents of each of which are hereby incorporated by reference.

FIELD

The present disclosure relates to improvements to publish-subscribe protocols.

More specifically, aspects relate to computer-implemented methods for communicating data in a communications network comprising one or more publisher devices, a broker and one or more subscriber devices. Further aspects relate to a publisher device and a broker configured to perform such methods, a communications network comprising such a publisher device and such a broker, a computer program comprising instructions which, when the program is executed by a computer, cause the computer to carry out such methods, a computer-readable data carrier having stored thereon such a computer program and a data carrier signal carrying such a computer program.

BACKGROUND

As machine to machine (M2M) communication increases and the internet of things (IoT) expands, new communication protocols are required which are adapted to the constraints of these environments. Such protocols should be easy to implement, with low bandwidth requirements and a small code footprint.

However, security is an issue of much concern as the IoT grows. Large volumes of data are collected by devices which, by virtue of their network connections, are vulnerable to hacking. Where that data is sensitive, it should be protected. Active devices should also be protected from malware which could be used to hijack their operation for nefarious purposes. Security features of the IoT devices themselves vary widely due to their differing purposes and disparate manufacturers. Communication between IoT devices is typically unconstrained in that traffic sent from a source to a target device will be communicated faithfully by the network according to whatever protocol is being used unless some invasive security service intervenes to filter or prevent communication. As IoT devices are added to a network in large quantities and with potentially disparate characteristics, keeping security services up-to-date is challenging.

One class of IoT communication protocols make use of publish-subscribe mechanisms where a mediator or broker is used to queue messages received from publisher devices for subsequent transmission to appropriate subscriber devices. This class of protocols includes Advanced Message Queuing Protocol (AMQP) and Message Queuing Telemetry Transport (MQTT). MQTT is a publish-subscribe messaging protocol which allows subscriber clients to register with a broker server for receipt of publications related to particular topics issued by publisher clients. (A client device can be one or both of a publisher and a subscriber.) The MQTT protocol requires an underlying transport such as transmission control protocol/internet protocol (TCP/IP) that provides an ordered, lossless stream of bytes from client to server and server to client. As a transport protocol, MQTT is concerned only with message transmission and it is the implementer's responsibility to provide appropriate security features. Connectionless network transports such as user datagram protocol (UDP) are not suitable on their own since they can lose or reorder data.

In MQTT networks a client (publisher and/or subscriber) is a device that establishes a network connection to the server (broker). It can:
 publish data on topics that other clients might be interested in;
 subscribe to topics that it is interested in receiving data on;
 unsubscribe to subscribed topics; and disconnect from the server.

The server (broker) is a device which acts as an intermediary between clients which publish and clients which have made subscriptions. The server:
 accepts network connections from clients;
 accepts publications by clients;
 processes subscribe and unsubscribe requests from clients; and
 forwards publications that match client subscriptions.

FIG. 1 schematically illustrates a typical IoT environment comprising a network 1100 which operates according to a publish-subscribe protocol such as MQTT. The network 1100 comprises a broker server 1110 configured to communicate with each of a plurality of clients 1121, 1122, 1123, 1124 and 1125 within the network 1100. Each of these client devices may be a publisher and/or a subscriber. The arrows marked T indicate an exemplary publication data flow for a publication on the topic temperature from a publisher device 1121 to the broker 1110 and on to subscriber devices 1124 and 1125 which have a subscription to the topic temperature registered with the broker 1110. The arrows marked P indicate an exemplary publication data flow for a publication on the topic pressure from a publisher device 1124 to the broker 1110 and on to subscriber devices 1122 and 1125 which have a subscription to the topic temperature registered with the broker 1110. If the broker 1110 receives a subscription request from an external client 1221, 1222 not within the trusted network 1100, the subscription request is by default refused.

FIG. 2 schematically illustrates an example computing device 2000 which could be used as any of the client or server devices illustrated in FIG. 1. The computing device 2000 comprises a processor 2001 operably connected to each of a memory 2002 and a transceiver 2003.

What is needed are methods of implementing publish-subscribe mechanisms to distribute data generated in IoT networks, which are secure and resource-efficient.

SUMMARY

According to a first aspect, there is provided a computer-implemented method for traffic control in a communications network comprising one or more publisher devices, a broker and one or more subscriber devices, the method comprising the broker:
 i-a. receiving a publication request from one of the publisher devices, the publication request comprising data having one or more data attributes comprising a topic to which said data relates, said topic being a subject of a subscription registered with the broker by one of the subscriber devices;
 i-b. applying one or more traffic control rules to:
  a profile of the one of the publisher devices, and
  one or more of the data attributes;

i-c. in response to completion of both of steps i-a and i-b, determining whether the applied traffic rules are met for the publication request; then ii. transmitting the data to the one of the subscriber devices only in response to determining that the one or more traffic control rules are met in step i-c.

The method can further comprise the broker transmitting a publication denial to the one of the publisher devices only in response to determining that the one or more traffic control rules are not met in step i-c.

The one or more data attributes can further comprise a non-topic attribute, the application of the one or more traffic control rules to one or more of the data attributes in step i-b being to at least said non-topic attribute, the non-topic attribute optionally being the application, operating system (OS) or kernel from which the data originated, or a version number thereof.

The method can further comprise the broker, prior to step i-b, generating and storing the profile of the one of the publisher devices.

Generating the profile of the one of the publisher devices can comprise monitoring publications made by the one of the publisher devices during an initialisation period and thereby determining one or more typical attributes of data published by the one of the publisher devices.

Step i-b can further comprise the broker applying the one or more traffic control rules to a profile of the one of the subscriber devices.

The method can further comprise the broker, prior to step i-c, generating and storing the profile of the one of the subscriber devices.

The method can further comprise the broker:

iii-a. transmitting a public key to the one or more publisher devices and the one or more subscriber devices, wherein:
  the data received in the publication request of step i-a comprises encrypted data, said encrypted data having been encrypted using a method which comprises using the public key;

iii-b. determining, based on one or more of the data attributes, whether a sensitivity level of the data is high, wherein:
  when step iii-b results in a determination that the sensitivity level of the data is not high, step ii comprises transmitting the encrypted data to the one of the subscriber devices only in response to determining that the one or more traffic control rules are met in step i-c; and
  when step iii-b results in a determination that the sensitivity level of the data is high, step ii comprises encrypting the encrypted data to produce double-encrypted data, then transmitting the double-encrypted data to the one of the subscriber devices only in response to determining that the one or more traffic control rules are met in step i-c.

The one or more data attributes on which the determination of step iii-b are based can comprise one or both of:
  the topic; and
  an application from which the data originates.

Step iii-b can comprise categorising the data as having a sensitivity level selected from "high" and "not high". Said categorising can optionally comprise:
  allocating the data a sensitivity score; then
  when the sensitivity score is above a predetermined high sensitivity threshold, categorising the data as having a sensitivity level of "high"; and
  otherwise categorising the data as having a sensitivity level of "not high".

The step of encrypting the encrypted data can be performed according to an advanced encryption standard (AES) method.

The step of encrypting can be performed according to an elliptic curve cryptography (ECC) method.

The method can further comprise the broker:
  registering the subscription of the one of the subscriber devices, said registering step comprising synchronising a counter or timer with the one of the subscriber devices according to a one-time password (OTP) protocol;
  subsequently:
  receiving an OTP request from the one of the subscriber devices to extend the subscription to an external device not comprised in the communications network, wherein the communications network is a trusted communications network;
  responsive thereto, generating a broker OTP according to the protocol;
  responsive thereto, transmitting the broker OTP to the one of the subscriber devices;
  subsequently:
  receiving a subscription request from the external device, said subscription request comprising an external device OTP;
  responsive thereto, confirming that the broker OTP and the external device OTP match; and
  responsive thereto, registering an external subscription of the external device to publications relating to the topic.

Step ii can further comprise transmitting the data to the external device only in response to determining that the one or more traffic control rules are met in step i-c.

The method can further comprise the broker encrypting the data before transmitting it to the external device.

The OTP request can comprise one or more attributes of the external device. The subscription request can comprise one or more attributes of the external device. The method can further comprise the broker confirming that the one or more attributes of the external device received in the OTP request match the one or more attributes of the external device received in the subscription request, wherein registering the subscription of the external device is further responsive to this confirmation.

The OTP protocol can use either the hash-based message authentication codes (HMAC-based OTP, HOTP) algorithm or the time-based OTP (TOTP) algorithm.

According to a second aspect, there is provided a broker configured to perform the method of the first aspect.

According to a third aspect, there is provided a communications network comprising the broker of the second aspect, one or more publisher devices and one or more subscriber devices.

The communications network can be configured to operate according to the Message Queuing Telemetry Transport (MQTT) protocol.

According to a fourth aspect, there is provided a computer program comprising instructions which, when the program is executed by a computer, cause the computer to carry out the method of the first aspect.

According to a fifth aspect, there is provided a computer-readable data carrier having stored thereon the computer program of the fourth aspect.

According to a sixth aspect, there is provided a data carrier signal carrying the computer program of the fourth aspect.

According to a seventh aspect, there is provided a computer-implemented method for communicating data in a communications network comprising one or more publisher devices, a broker and one or more subscriber devices, the method comprising one of the publisher devices:
- i-a. receiving a public key from the broker;
- i-b. determining, based on one or more attributes of data to be published to the broker, whether a sensitivity level of the data is low; and
- ii. following completion of both of steps i-a and i-b, publishing the data to the broker, wherein:
  - when step i-b results in a determination that the sensitivity level of the data is low, step ii comprises transmitting the data to the broker unencrypted; and
  - when step i-b results in a determination that the sensitivity level of the data is not low, step ii comprises encrypting the data then transmitting resulting encrypted data to the broker, wherein the step of encrypting the data comprises using the public key.

The one or more attributes can comprise one or both of:
- a topic to which the data relates; and
- an application from which the data originates.

Step i-b can comprise categorising the data as having a sensitivity level selected from "low" and "not low". Said categorising can optionally comprise:
- allocating the data a sensitivity score; then
  - when the sensitivity score is below a predetermined low sensitivity threshold, categorising the data as having a sensitivity level of "low"; and
  - otherwise categorising the data as having a sensitivity level of "not low".

The encrypted data can comprise ciphertext and a hash signature. The step of encrypting the data can comprise generating the hash signature by hashing one or more attributes of the one of the publisher devices with the ciphertext, wherein said one or more attributes of the one of the publisher devices constitute a publisher device profile accessible to the broker.

The method can further comprise the broker receiving the encrypted data and verifying the signature by hashing the publisher device profile with the ciphertext and confirming that the result matches the signature received in the encrypted data.

The step of encrypting the data can be performed according to an attribute-based encryption (ABE) method.

According to an eighth aspect, there is provided a computer-implemented method for communicating data in a communications network comprising one or more publisher devices, a broker and one or more subscriber devices, the method comprising the broker:
- iii-a. transmitting a public key to the one or more publisher devices and the one or more subscriber devices;
- iii-b. registering one of the publisher devices as a publisher of data so that the publisher device can publish data having one or more attributes, said one or more attributes comprising a topic to which the data relates;
- iii-c. registering one of the subscriber devices as a subscriber of data relating to the topic;
- iii-d. subsequent to step iii-a, receiving a publication request comprising encrypted data relating to that topic from the one of the publisher devices, said encrypted data having been encrypted using a method which comprises using the public key;
- iii-e. determining, based on one or more of said attributes, whether a sensitivity level of the data is high; and
- iv. publishing the encrypted data to the one of the subscriber devices, wherein:
  - when step iii-e results in a determination that the sensitivity level of the data is not high, step iv comprises transmitting the encrypted data to the one of the subscriber devices; and
  - when step iii-e results in a determination that the sensitivity level of the data is high, step iv comprises encrypting the encrypted data to produce double-encrypted data, then transmitting the double-encrypted data to the one of the subscriber devices.

The one or more attributes on which the determination of step iii-e are based can comprise one or both of:
- the topic to which the data relates; and
- an application from which the data originates.

Step iii-e can comprise categorising the data as having a sensitivity level selected from "high" and "not high". Said categorising can optionally comprise:
- allocating the data a sensitivity score; then
  - when the sensitivity score is above a predetermined high sensitivity threshold, categorising the data as having a sensitivity level of "high"; and
  - otherwise categorising the data as having a sensitivity level of "not high".

The step of encrypting the encrypted data can be performed according to an advanced encryption standard (AES) method.

According to a ninth aspect, there is provided the method of the seventh aspect, wherein step i-b results in a determination that the sensitivity level of the data is not low, said method further comprising the method of the eighth aspect, wherein the encrypted data received by the broker in step iii-d is the encrypted data transmitted by the publisher device in step ii.

In any of the seventh to ninth aspects, the step of encrypting can be performed according to an elliptic curve cryptography (ECC) method.

The method of the eighth aspect can further comprise the broker:
- applying one or more traffic control rules to:
  - a profile of the one of the publisher devices, and
  - one or more of the attributes; then
- determining whether the applied traffic rules are met for the publication request;
- wherein step iv is performed only in response to determining that the one or more traffic control rules are met.

In the method of the eighth aspect, step iii-c can comprise the broker synchronising a counter or timer with the one of the subscriber devices according to a one-time password (OTP) protocol. The method can further comprise the broker subsequently:
- receiving an OTP request from the one of the subscriber devices to extend the subscription to an external device not comprised in the communications network, the communications network being a trusted communications network;
- responsive thereto, generating a broker OTP according to the protocol;
- responsive thereto, transmitting the broker OTP to the one of the subscriber devices;
- subsequently:
- receiving a subscription request from the external device, said subscription request comprising an external device OTP;
- responsive thereto, confirming that the broker OTP and the external device OTP match; and
- responsive thereto, registering a subscription of the external device to publications relating to the topic.

Step iv can further comprise transmitting the encrypted data to the external device.

Whether step iii-e results in a determination that the sensitivity level of the data is high or not, step iv can comprise encrypting the encrypted data to produce double-encrypted data, then transmitting the double-encrypted data to the external device.

The OTP request can comprise one or more attributes of the external device. The subscription request can comprise one or more attributes of the external device. The method can further comprise the broker confirming that the one or more attributes of the external device received in the OTP request match the one or more attributes of the external device received in the subscription request, wherein registering the subscription of the external device is further responsive to this confirmation.

The OTP protocol can use either the hash-based message authentication codes (HMAC-based OTP, HOTP) algorithm or the time-based OTP (TOTP) algorithm.

According to a tenth aspect, there is provided a publisher device configured to perform the method of the seventh aspect.

According to an eleventh aspect, there is provided a broker configured to perform the method of the eighth aspect.

According to a twelfth aspect, there is provided a communications network comprising the publisher device of the tenth aspect, the broker of the eleventh aspect and one or more subscriber devices.

The communications network can be configured to operate according to the Message Queuing Telemetry Transport (MQTT) protocol.

According to a thirteenth aspect, there is provided a computer program comprising instructions which, when the program is executed by a computer, cause the computer to carry out the method of either of the seventh or eighth aspects.

According to a fourteenth aspect, there is provided a computer-readable data carrier having stored thereon the computer program of the thirteenth aspect.

According to a fifteenth aspect, there is provided a data carrier signal carrying the computer program of the thirteenth aspect.

According to a sixteenth aspect, there is provided a computer-implemented method for securing communication of data from a trusted communications network comprising one or more publisher devices, a broker and one or more subscriber devices, the method comprising one of the one or more subscriber devices:
    registering a subscription to publications relating to a particular topic with the broker, said registering step comprising synchronising a counter or timer with the broker according to a one-time password (OTP) protocol;
    subsequently:
    requesting an OTP from the broker to extend the subscription to an external device not comprised in the trusted communications network;
    generating a subscriber OTP according to the protocol;
    receiving a broker OTP from the broker;
    confirming that the broker OTP and the subscriber OTP match; and
    responsive thereto, transmitting the broker OTP to the external device.

The method can further comprise the one of the subscriber devices receiving a publication from one of the one or more publication devices via the broker.

Requesting the OTP can comprise providing the broker with one or more attributes of the external device.

The broker OTP can be transmitted to the external device over a secure transport layer security (TLS) or secure socket layer (SSL) channel or an internet protocol security (IPsec) connection.

According to a seventeenth aspect, there is provided a computer-implemented method for securing communication of data from a trusted communications network comprising one or more publisher devices, a broker and one or more subscriber devices, the method comprising the broker:
    registering a subscription of one of the one or more subscriber devices to publications relating to a topic, said registering step comprising synchronising a counter or timer with the one of the subscriber devices according to a one-time password (OTP) protocol;
    subsequently:
    receiving an OTP request from the one of the subscriber devices to extend the subscription to an external device not comprised in the trusted communications network;
    responsive thereto, generating a broker OTP according to the protocol;
    responsive thereto, transmitting the broker OTP to the one of the subscriber devices;
    subsequently:
    receiving a subscription request from the external device, said subscription request comprising an external device OTP;
    responsive thereto, confirming that the broker OTP and the external device OTP match; and
    responsive thereto, registering a subscription of the external device to publications relating to the topic.

The method can further comprise the broker:
    receiving a publication request from one of the one or more publisher devices, said publication request being for a publication relating to the topic; and
    responsive thereto, transmitting the publication to the one of the subscriber devices and the external device.

The method can further comprise the broker encrypting data received in the publication request before transmitting it to the external device.

The OTP request can comprise one or more attributes of the external device. The subscription request can comprise one or more attributes of the external device. The method can further comprise the broker confirming that the one or more attributes of the external device received in the OTP request match the one or more attributes of the external device received in the subscription request, wherein registering the subscription of the external device is further responsive to this confirmation.

The OTP protocol can use either the hash-based message authentication codes (HMAC-based OTP, HOTP) algorithm or the time-based OTP (TOTP) algorithm.

The publication request can comprise data having one or more data attributes comprising the topic. The method can further comprise the broker:
    applying one or more traffic control rules to:
        a profile of the one of the publisher devices, and
        one or more of the data attributes; then
    determining whether the applied traffic rules are met for the publication request;
    wherein transmitting the publication to the one of the subscriber devices and the external device is performed only in response to determining that the one or more traffic control rules are met.

The one or more data attributes can further comprise a non-topic attribute, the application of the one or more traffic control rules to one or more of the data attributes being to at least said non-topic attribute, the non-topic attribute optionally being the application, operating system (OS) or kernel from which the data originated, or a version number thereof.

The method can further comprise the broker, prior to applying the one or more traffic control rules, generating and storing the profile of the one of the publisher devices; wherein generating the profile of the one of the publisher devices optionally comprises monitoring publications made by the one of the publisher devices during an initialisation period and thereby determining one or more typical attributes of data published by the one of the publisher devices.

Applying the one or more traffic control rules can further comprise the broker applying the one or more traffic control rules to a profile of the one of the subscriber devices and a profile of the external device. The method can optionally further comprise the broker, prior to applying the one or more traffic control rules, generating and storing the profile of the one of the subscriber devices and the profile of the external device.

The method could further comprise the broker transmitting a public key to the one or more publisher devices and the one or more subscriber devices prior to receipt of the publication request;
wherein the publication request comprises encrypted data, said encrypted data having been encrypted using a method which comprises using the public key; the method further comprising the broker determining, based on one or more attributes of the encrypted data, whether a sensitivity level of the encrypted data is high; wherein:
  when the determining step results in a determination that the sensitivity level of the encrypted data is not high, transmitting the publication comprises transmitting the encrypted data; and
  when the determining step results in a determination that the sensitivity level of the encrypted data is high, transmitting the publication comprises encrypting the encrypted data to produce double-encrypted data, then transmitting the double-encrypted data.

The one or more attributes on which the determining step are based can comprise one or both of:
  the topic; and
  an application from which the encrypted data originates.

The step of determining whether a sensitivity level of the encrypted data is high can comprise categorising the encrypted data as having a sensitivity level selected from "high" and "not high". Said categorising can optionally comprise:
  allocating the encrypted data a sensitivity score; then
  when the sensitivity score is above a predetermined high sensitivity threshold, categorising the encrypted data as having a sensitivity level of "high"; and
  otherwise categorising the encrypted data as having a sensitivity level of "not high".

The step of encrypting the encrypted data can be performed according to an advanced encryption standard (AES) method.

The step of encrypting can be performed according to an elliptic curve cryptography (ECC) method.

According to an eighteenth aspect, there is provided a subscriber device configured to perform the method of the sixteenth aspect.

According to a nineteenth aspect, there is provided a broker configured to perform the method of the seventeenth aspect.

According to a twentieth aspect, there is provided a communications network comprising the subscriber device of the eighteenth aspect, the broker of the nineteenth aspect and one or more publisher devices.

The communications network can be configured to operate according to the Message Queuing Telemetry Transport (MQTT) protocol.

According to a twenty-first aspect, there is provided a computer program comprising instructions which, when the program is executed by a computer, cause the computer to carry out the method of either of the sixteenth or seventeenth aspects.

According to a twenty-second aspect, there is provided a computer-readable data carrier having stored thereon the computer program of the twenty-first aspect.

According to a twenty-third aspect, there is provided a data carrier signal carrying the computer program of the twenty-first aspect.

BRIEF DESCRIPTION OF THE FIGURES

Aspects of the present disclosure will now be described by way of example with reference to the accompanying figures. In the figures.

DETAILED DESCRIPTION OF THE FIGURES

Figure 1:
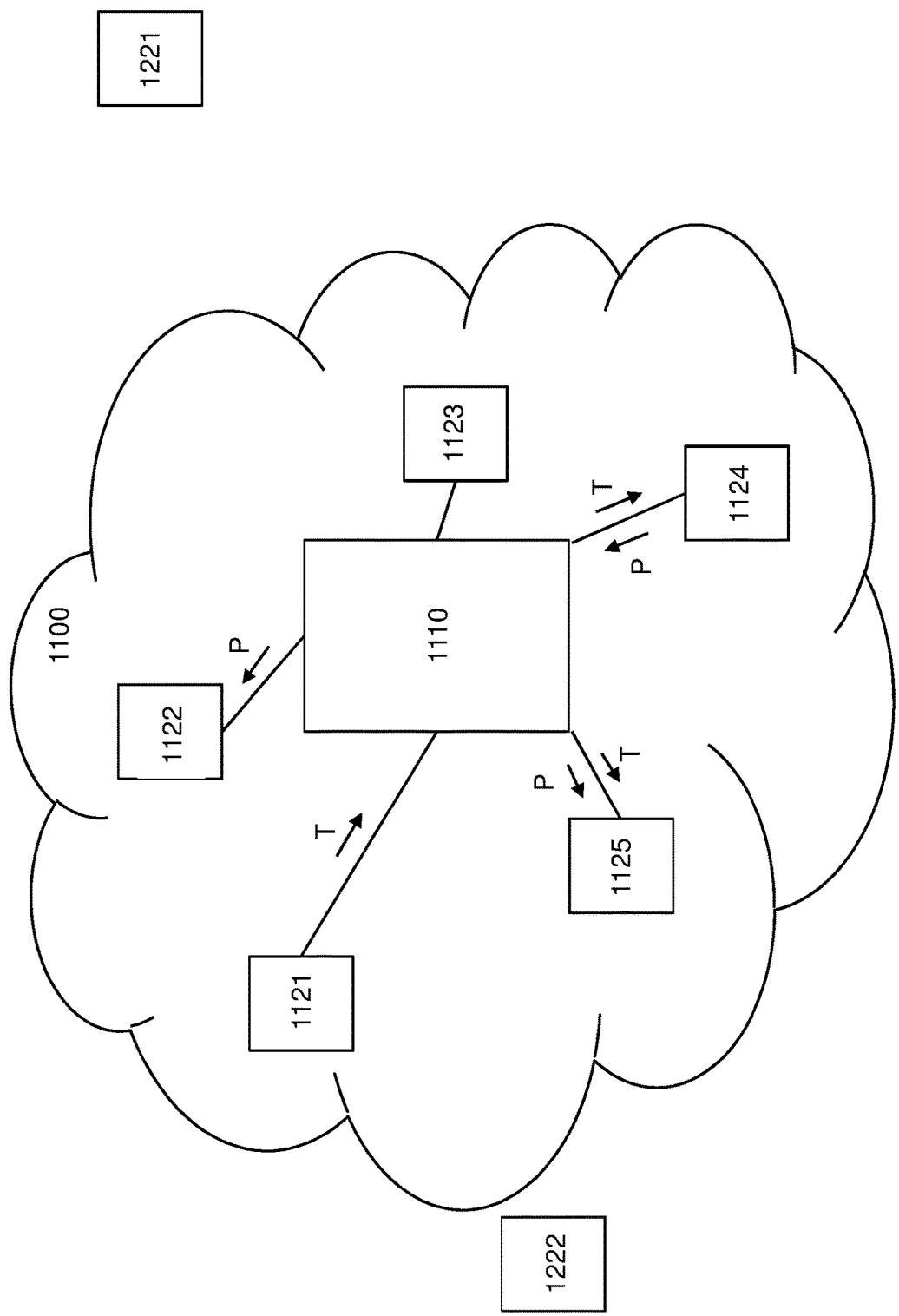
FIG. 1 schematically illustrates a typical IoT environment.
Figure 2:
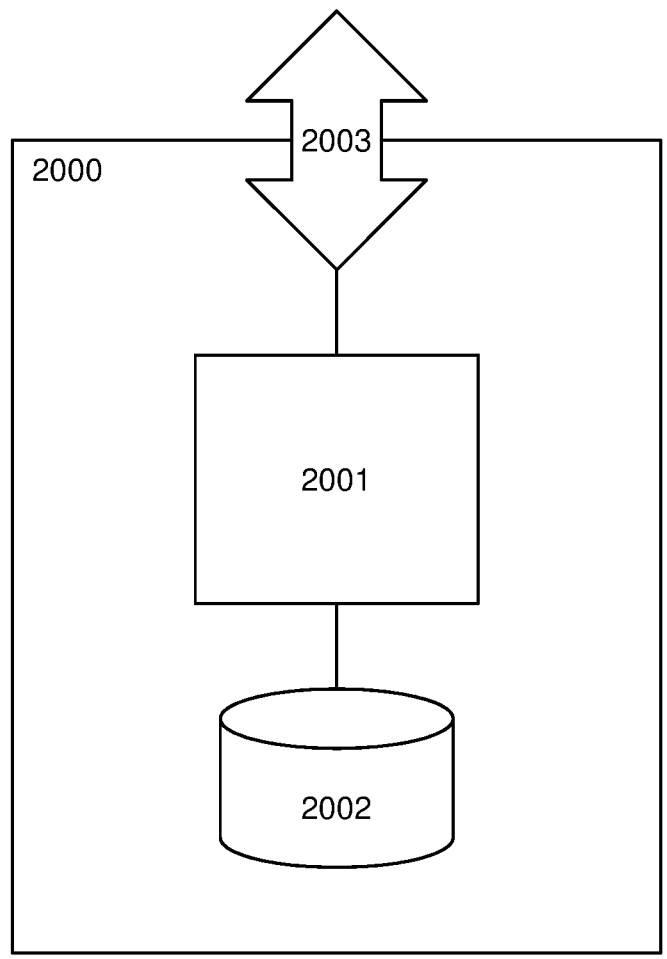
FIG. 2 schematically illustrates an example computing device.

The following description is presented to enable any person skilled in the art to make and use the system and is provided in the context of a particular application. Various modifications to the disclosed embodiments will be readily apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers.

User input devices can include, without limitation, microphones, buttons, keypads, touchscreens, touchpads, trackballs, joysticks and mice. User output devices can include, without limitation, speakers, buzzers, display screens, projectors, indicator lights, haptic feedback devices and refreshable braille displays. User interface devices can comprise one or more user input devices, one or more user output devices, or both.

Attribute-Based Traffic Control

In publish-subscribe networks each publisher typically publishes data having a particular set of attributes. For example, a publisher might publish data from a particular application, relating to a particular topic, from a particular location, in a particular temporal pattern. If the publisher becomes infected with malware, the malware might attempt to publish data which should be kept confidential to the publisher device. According to the present disclosure, such malicious publications can be prevented by the broker. This is achieved by the broker referring to a profile of the publisher and applying traffic control rules to that profile and one or more attributes of data the publisher is seeking to publish in order to block anomalous publications and authenticate other publications. For example, traffic control rules configured to detect atypical publication requests can be tested against attributes of payload data received by the broker in a publication request. Such data attributes could for example comprise one or more of: an application, operating system (OS) and/or kernel signature (e.g. identifying the application, OS and/or kernel the data originated from, and optionally the version number thereof), a topic tag, a location stamp and a time stamp.

This technique provides improved security beyond what is available through use of firewall technology, which blocks data transfer on the basis of attributes of the connection it is to be transferred over (e.g. the combination of origin and destination addresses and/or ports and/or the transport protocol being used) but does not consider attributes of the data itself. According to the present disclosure, publisher profiles can comprise connection attributes in addition to data attributes for even more robust protection. For example, if a publisher's profile indicates it usually only publishes temperature data on port 53, the broker can block it from publishing voice data on port 53 or temperature data on port 950. Device attributes such as device identifier (ID), manufacturer and model could also be comprised in publisher profiles. The greater the number of attributes the traffic control rules test against profiles, the more difficult it becomes for malware to successfully spoof legitimate publications for illegitimate purposes. Spoofing of data attributes can be made more difficult by encrypting them (which is not generally possible for connection attributes). If the data attributes comprise the version of an application and/or OS and/or kernel from which the data originates then traffic control rules can be applied to ensure that only publications from devices which are sufficiently up to date to apply suitable security measures and bug fixes are permitted.

Authentication procedures being performed on establishing a publisher-broker connection for the first time, and/or on initiating a communication session, can be valuable, for example when key exchange is required to enable subsequent encryption of communications as discussed below in relation to an attribute-based data security aspect of this disclosure. However, this alone does not protect against malicious publications made by malware infections occurring mid-session, or malware attacks which wait until mid-session to make malicious publications. Considering whether or not to publish data on a request-by-request basis, as opposed to as part of an initial authentication of a publisher, guards against infection of a publisher (or activation of a dormant malware infection) occurring subsequent to initial authentication.

In addition to the security benefits, blocking publications of data with attributes that fail to comply with traffic control rules as applied to publisher profiles avoids network resource wastage as a result of both malicious publications and erroneous publications, which could for example be caused by malfunction of a publisher. Network resources such as electrical power, processing power, memory and bandwidth are therefore saved. For example, a publisher profile may indicate that it publishes to a particular topic every 30 seconds. If a bug in the publishing application causes attempts at publication every 15 seconds then the broker can block alternate publications to avoid resources being wasted on extraneous publications.

Publisher profiles could be established as part of the process of each publisher registering with the broker, with the publisher or a trusted third party providing the broker, or a remote profile store to which the broker has access, with profile details. Alternatively or additionally, profile details could be learned and stored by the broker by monitoring publications of the publisher over an initial set-up period.

Traffic control rules could be stored at the broker or in a separate repository to which the broker has access.

Figure 3:
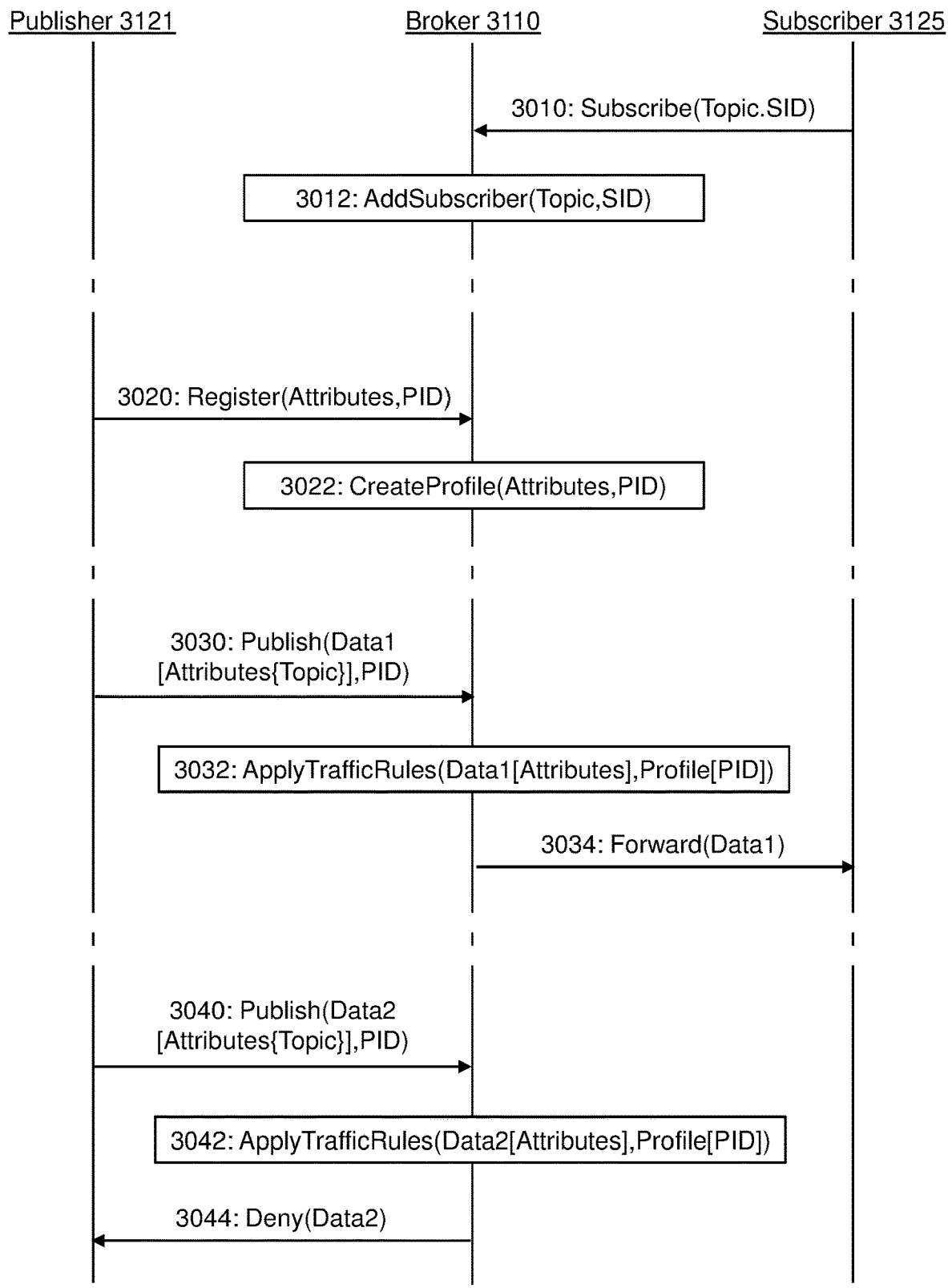
FIG. 3 illustrates an example message sequence which makes use of attribute-based traffic control techniques.

FIG. 3 illustrates an example message sequence which makes use of attribute-based traffic control techniques as described above.

At step 3010 a subscriber 3125 sends a subscription request to a broker 3110. At step 3012 the broker 3110 registers the subscription. The subscription request comprises the topic to which the subscriber 3125 wishes to subscribe and means of identifying the subscriber 3125, such as an ID number (SID).

At step 3020 a publisher 3121 sends a registration request to the broker 3110, the registration request comprising attributes for generating a publisher profile and means of identifying the publisher 3121, such as an ID number. At step 3022 the broker 3110 generates and stores a profile for the publisher 3121. Alternatively, a manufacturer of the publisher device 3121 could supply a publisher profile (or one or more attributes for generating the publisher profile) to the broker 3110 in advance. A further option is for the broker 3110 to generate the profile by monitoring publications made by the publisher 3121 in an initialisation period during which the traffic control techniques described herein are not applied. This approach introduces a risk from early malware infections occurring or first activated during the initialisation period but allows the publisher 3121 to start publishing immediately on establishing a connection with the broker 3110.

Steps 3010 and 3012 could precede steps 3020 and 3022 as shown, or vice-versa. Alternatively, steps 3010 and 3012 could run in parallel with steps 3020 and 3022.

As shown and described above, the registration of the subscriber only requires the subscription request to identify the subscriber 3125 and the topic they wish to subscribe to. Alternatively, steps 3010 and 3012 could mirror steps 3020 and 3022 respectively, with registration of the subscriber 3125 involving transmission of attributes and creation of a profile. That is, both subscriber and publisher registration with the broker could follow a generic client registration process.

At a later time, following registration of both the publisher 3121 and the subscriber 3125 with the broker 3110, at step 3030 the publisher 3121 sends a first publication request to the broker 3110, requesting publication of data relating to the topic the subscriber 3125 is subscribed to. At step 3032 the broker 3110 retrieves the profile of the publisher 3121 and inputs that profile and attributes of the data in the first publication request to traffic control rules. The first publication request passes the test, so at step 3034 the broker 3110 forwards the data to the subscriber 3125 to complete an assured publication.

At another time, also following registration of both the publisher 3121 and the subscriber 3125 with the broker 3110 (but at any time relative to steps 3030, 3032 and 3034), at step 3040 the publisher 3121 sends a second publication request to the broker 3110, requesting publication of data relating to the topic the subscriber 3125 is subscribed to. At step 3042 the broker 3110 retrieves the profile of the publisher 3121 and inputs that profile and attributes of the data in the second publication request to traffic control rules. The second publication request however is associated with different data attributes to the first and fails the test. The data in the second publication request is therefore blocked, i.e. not forwarded on to the subscriber 3125. Instead, at optional step 3044 the broker 3110 can notify the publisher 3121 that the second publication request has been denied.

Figure 4:
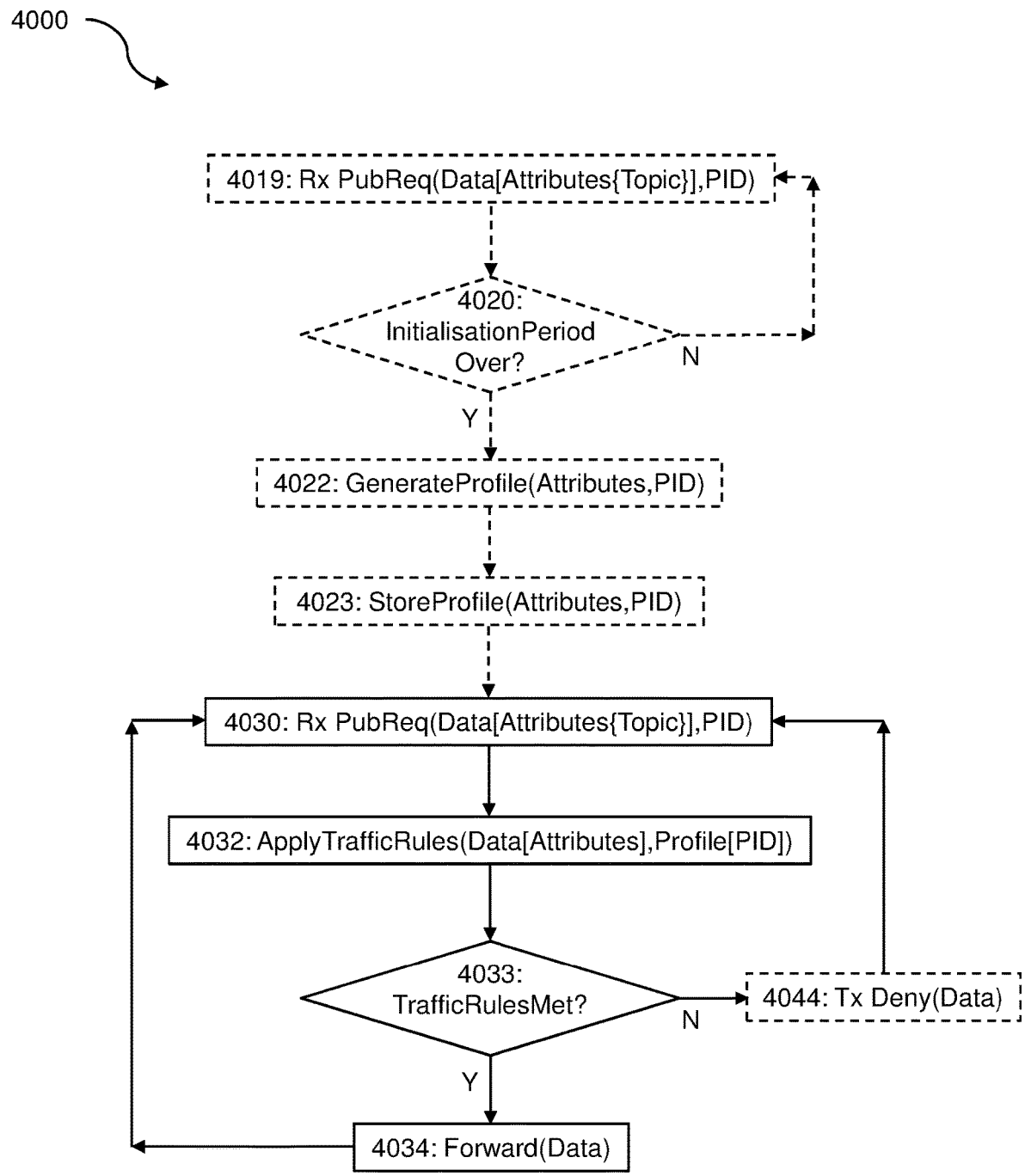
FIG. 4 illustrates an example computer-implemented method for traffic control.

FIG. 4 illustrates an example computer-implemented method 4000 for traffic control in a communications network (such as the network 1100 of FIG. 1) comprising one or more publisher devices (such as the clients 1121 and 1124 of FIG. 1), a broker (such as the server 1110 of FIG. 1) and one or more subscriber devices (such as the clients 1122, 1124 and 1125 of FIG. 1). The method 4000 is performed by the broker. The broker could be a single server or multiple servers in communication with one another with various processing, storage and communication functions distributed amongst them.

At step 4030 the broker receives a publication request from one of the publisher devices, the publication request comprising data having one or more data attributes comprising a topic to which said data relates, said topic being a subject of a subscription registered with the broker by one of the subscriber devices.

At step 4032 the broker applies one or more traffic control rules to a profile of the one of the publisher devices and one or more of the data attributes.

At query 4033 the broker determines whether or not the applied traffic rule(s) are met and thus whether to forward the data to the one of the subscriber devices at step 4034 (if the result of applying the one or more traffic control rules in step 4032 is a positive determination at query 4033) or not (if the result of applying the one or more traffic control rules in step 4032 is a negative determination at query 4033). Either way, the process then returns to step 4030 for receipt of the next publication request.

So long as they are both complete before query 4033 is enacted, steps 4030 and 4032 can be performed in either order. If step 4030 is performed prior to step 4032 as shown then the traffic control rules only need to be applied to the specific combination of data attributes and publisher profile occasioned by the publication request, but the publication process is slightly slowed by the need to perform step 4032 on the fly. In contrast, if step 4032 is performed prior to step 4030 then the traffic control rules must be applied to every possible combination of data attributes and publisher profiles in advance—requiring relatively high setup time and processing power, and stored for future reference—imposing relatively high memory demands. In that case the publication process itself could however be a little faster.

If the outcome of query 4033 is negative, the broker could optionally transmit a publication denial to the one of the publisher devices at optional step 4044.

The one or more data attributes could comprise a non-topic attribute to which the one or more traffic control rules are applied. For example, the data attributes could comprise a time stamp and a location stamp. The publisher profile could indicate a temporal location pattern for the publisher device which can be tested against the time and location stamps by the traffic control rules. If the publisher device is a smartwatch provided to an athlete to monitor their heart rate during training sessions for example, the profile could indicate the athlete's training schedule with associated gym and training ground locations. If the smartwatch were to become infected with malware which sought to publish the athlete's heart rate at other combinations of times and locations then the broker could block such publications.

The method could optionally further comprise the broker, prior to step 4032, generating the profile of the one of the publisher devices at optional step 4022 and storing the profile at optional step 4023.

The profile could optionally be generated by monitoring publications made by the one of the publisher devices during an initialisation period and thereby determining one or more typical attributes of data published by the one of the publisher devices. This is illustrated at optional step 4019, where the broker receives a publication request, followed by optional query 4020, where the broker determines whether the initialisation period is over. If it is, the process proceeds to step 4022 and if not, the process returns to step 4019.

The application of the traffic control rules at step 4032 could further comprise the broker applying the one or more traffic control rules to a profile of the one of the subscriber devices. Returning to the example of the athlete with a smartwatch, their coach may have a personal computer (PC) registered as a subscriber to the topic heartrate and the athlete may also register their own smartphone as a subscriber to the topic heartrate. The traffic control rules could specify that the coach's PC can receive heartrate publications from the smartwatch relating to training sessions, i.e. during time windows indicated as training sessions on the athlete's training schedule, while the athlete's smartphone can receive all heartrate publications from the smartwatch. The broker could generate and store the profile of the one of the subscriber devices in a similar manner to creation of the publisher profile as described above.

According to the methods described above, atypical traffic can be automatically blocked to reduce the risk of malicious or extraneous publications being completed. In the event of a publication being blocked, a user alert could optionally be raised to prompt a user to investigate the reason for the anomalous publication attempt. Such an alert could be raised directly by the broker if it comprises a suitable user interface device, or the broker could cause another device to raise a user alert. For example, the transmission of a publication denial message to the publisher at optional step 4044 could trigger a user alert at a user output device of the publisher device.

While the above methods improve data security by reducing the risk of traffic being miss-directed (whether maliciously or erroneously), they do not in themselves provide protection against invasive attacks intended to intercept communications. The techniques described above could however be combined with those detailed in the following section of the disclosure to provide such protection where necessary.

Attribute-Based Data Security

Encryption of data in M2M communication is rare due to the limited resources available to many IoT devices. Where encryption is used, it is generally only implemented unilaterally for transport, not for data at rest. However, the present inventors have recognised that, in publish-subscribe networks, attributes of data to be published can be determinative for whether or not encryption is needed. A publisher automatically considering attributes of the data it wishes to publish, then making a decision as to whether to encrypt or not, means that sensitive data is secured, both in transit and at rest at the broker, while resources are not wasted on unnecessary encryption. Similarly, a broker can determine, based on the data attributes, whether or not double-encryption is warranted for onwards transmission to subscribers. Suitable data attributes could for example include a topic to which the data relates and/or an application from which it originates.

Figure 5A:
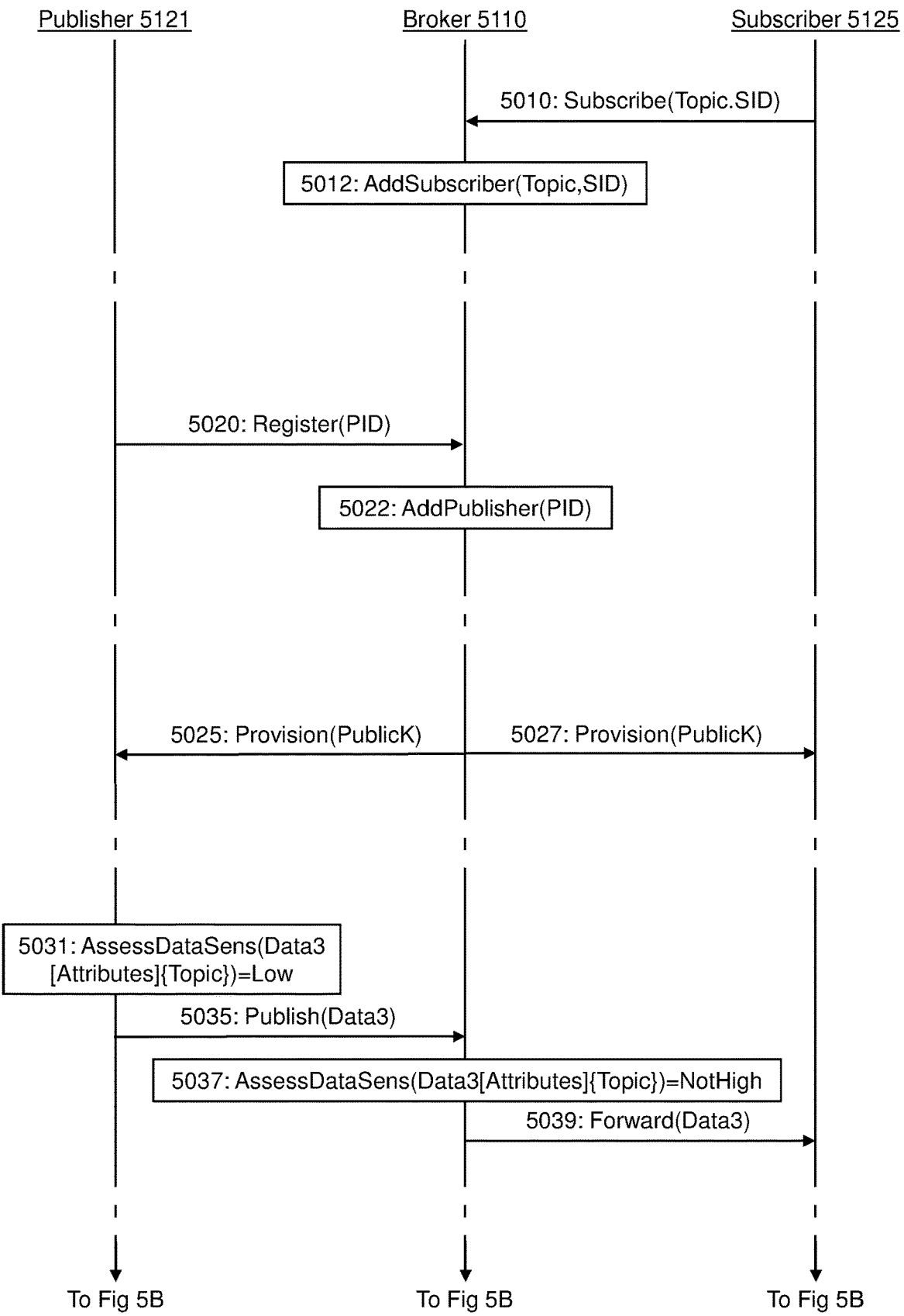
FIGS. 5A and 5B illustrate an example message sequence which makes use of attribute-based data security methods.
Figure 5B:
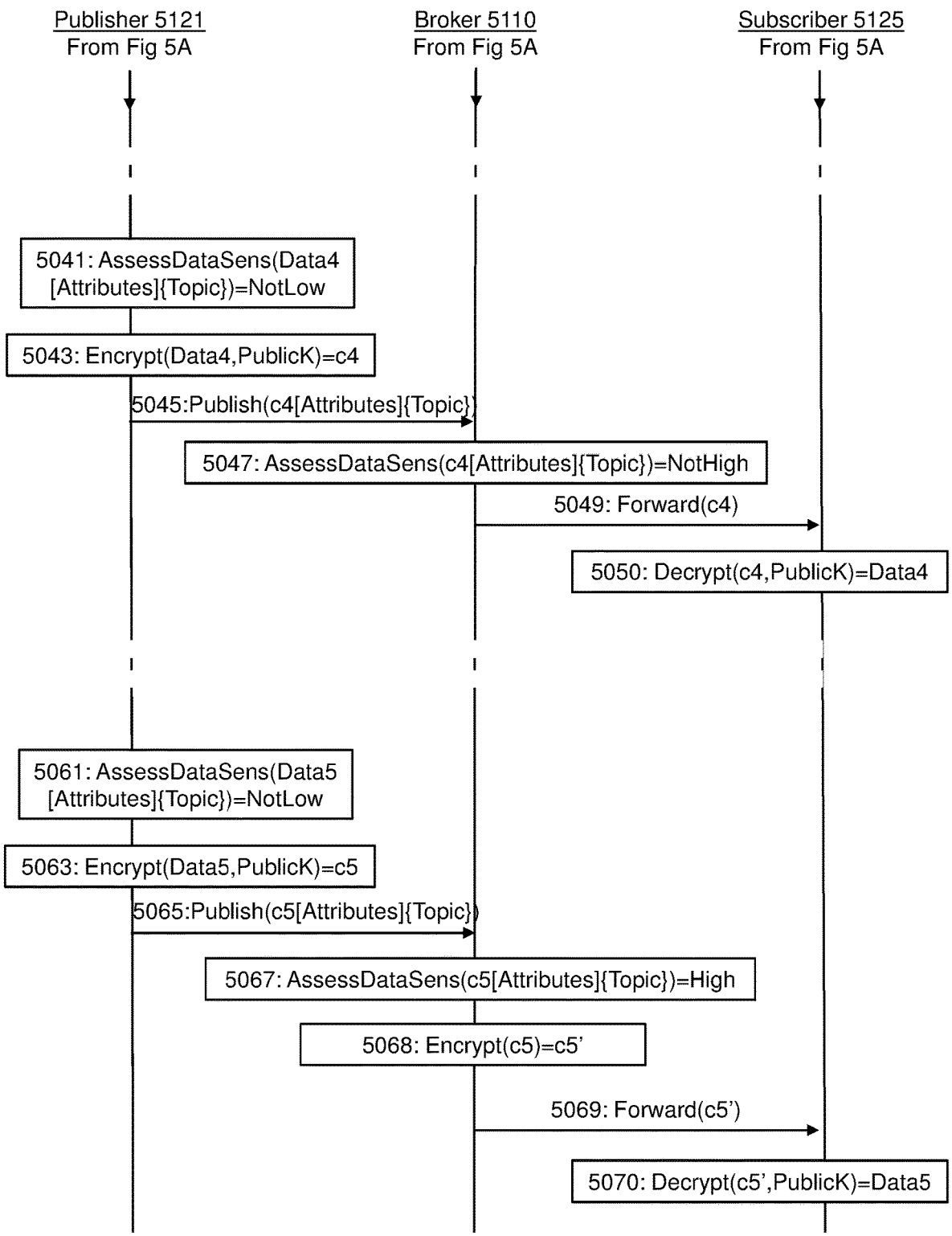

FIGS. 5A and 5B illustrate an example message sequence which makes use of these attribute-based data security methods.

Starting with FIG. 5A, at step 5010 a subscriber 5125 sends a subscription request to a broker 5110. At step 5012 the broker 5110 registers the subscription. The subscription request comprises the topic to which the subscriber 5125 wishes to subscribe and means of identifying the subscriber 5125, such as an ID number (SID).

At step 5020 a publisher 5121 sends a registration request to the broker 5110, the registration request comprising a means of identifying the publisher 5121, such an ID number (PID).

Steps 5010 and 5012 could precede steps 5020 and 5022 as shown, or vice-versa. Alternatively, steps 5010 and 5012 could run in parallel with steps 5020 and 5022.

At a later time, following registration of both the publisher 5121 and the subscriber 5125 with the broker 5110, the broker 5110 provisions both the publisher 5121 and subscriber 5125 with its public key (PublicK) at steps 5025 and 5027 respectively. Once both the publisher 5121 and subscriber 5125 have been provided with the broker 5110's public key, the publisher 5121 can begin publishing.

After both the publisher 5121 and the subscriber 5125 have been provisioned with the broker 5110's public key, the publisher 5121 prepares some data relating to the topic to which the subscriber 5125 has subscribed for publication. At step 5031 the publisher 5121 assesses the sensitivity of the data it wishes to publish, according to its attributes, determining that the sensitivity of the data is low and that encryption is therefore not required. Therefore, at step 5035 the publisher 5121 sends a publication request to the broker 5110, requesting publication of the data without encrypting the data. At step 5037 the broker 5110 assesses the sensitivity level of the data, according to its attributes, determining that the sensitivity of the data is not high and that encryption is therefore not required. At step 5039 the broker 5110 therefore forwards the data to the subscriber 5125 without encrypting it.

Moving to FIG. 5B, at another time, also following provision of both the publisher 5121 and the subscriber 5125 with the broker 5110's public key (but at any time relative to steps 5031, 5035, 5037 and 5039), the publisher 5121 prepares some more data relating to the topic to which the subscriber 5125 has subscribed for publication. At step 5041 the publisher 5121 assesses the sensitivity of the data it wishes to publish, according to its attributes, determining that the sensitivity of that data is not low and that encryption is therefore required. Therefore, at step 5043 the data is encrypted using the broker 5110's public key to create a ciphertext. At step 5045 the publisher 5121 sends a publication request to the broker 5110, requesting publication of data relating to the topic the subscriber 5125 is subscribed to, with the ciphertext included rather than the data itself. At step 5047 the broker 5110 assesses the sensitivity level of the data, according to its attributes, determining that the sensitivity of the data is not high and that double encryption is therefore not required. At step 5049 the broker 5110 therefore forwards the ciphertext to the subscriber 5125 without double encrypting it. Finally, at step 5050 the subscriber 5125 decrypts the ciphertext using the broker 5110's public key.

At another time, also following provision of both the publisher 5121 and the subscriber 5125 with the broker 5110's public key (but at any time relative to steps 5031, 5035, 5037, 5039, 5041, 5043, 5045, 5047, 5049 and 5050), the publisher 5121 prepares some more data relating to the topic to which the subscriber 5125 has subscribed for publication. At step 5061 the publisher 5121 assesses the sensitivity of the data it wishes to publish, according to its attributes, determining that the sensitivity of that data is not low and that encryption is therefore required. Therefore, at step 5063 the data is encrypted using the broker 5110's public key to create a ciphertext. At step 5065 the publisher 5121 sends a publication request to the broker 5110, requesting publication of data relating to the topic the subscriber 5125 is subscribed to, with the ciphertext included rather than the data itself. At step 5067 the broker 5110 assesses the sensitivity level of the data, according to its attributes, determining that the sensitivity of the data is high and that double encryption is therefore required. Therefore, at step 5068 the ciphertext is encrypted by the broker. At step 5069 the broker 5110 forwards the encrypted ciphertext to the subscriber 512. Finally, at step 5070 the subscriber 5125 decrypts the encrypted ciphertext.

The encryption by the publisher 5121 at steps 5043 and 5063 can for example be done via attribute-based encryption as will be described further below. The double encryption by the broker 5110 at step 5068 can for example be performed according to an advanced encryption standard (AES) method. AES symmetric encryption could be used with a new key for each publication in order to offer forward-secrecy. Any of the encryption steps could for example make use of elliptic curve cryptography (ECC) techniques.

The encrypted data transmitted in steps 5045 and 5065 could comprise a hash signature. Such a hash signature could for example be generated by hashing one or more attributes of the publisher 5121 with the ciphertext. Those attributes could constitute a publisher device profile accessible to the broker 5110, for example as described above in relation to attribute-based traffic control methods. The broker 5110 could then verify the signature by hashing the publisher device profile with the ciphertext and confirming that the result matches the signature received in the publication request.

The attribute-based traffic control methods described above could be combined with attribute-based data security methods. For example steps corresponding to steps 3022, 3032 and 3042 of FIG. 3 could be included in the method of FIGS. 5A and 5B.

Figure 6:
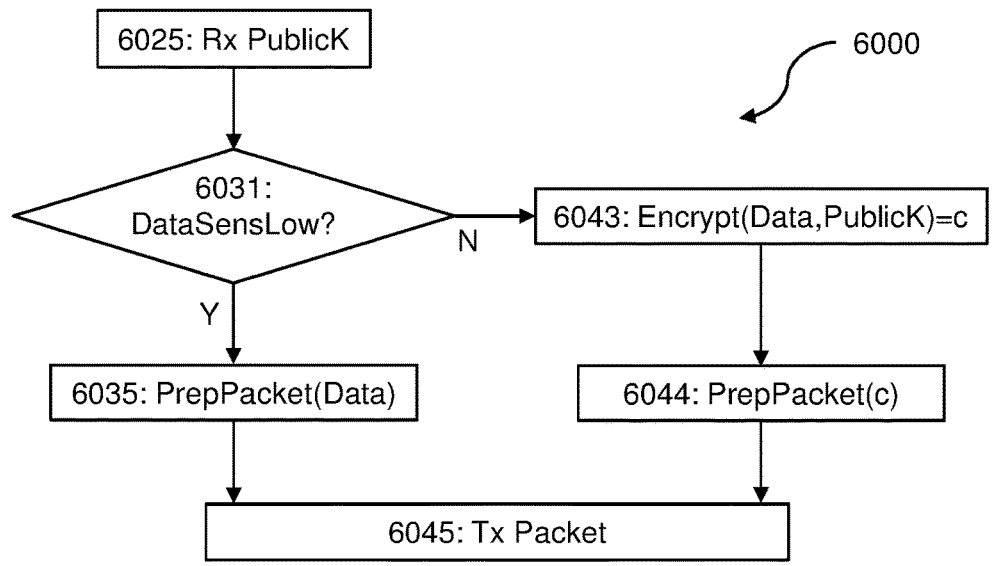
FIGS. 6 and 7 illustrate example computer-implemented methods for communicating data in a communications network.

FIG. 6 illustrates an example computer-implemented method 6000 for communicating data in a communications network (such as the network 1100 of FIG. 1) comprising one or more publisher devices (such as the clients 1121 and 1124 of FIG. 1), a broker (such as the server 1110 of FIG. 1) and one or more subscriber devices (such as the clients 1122, 1124 and 1125 of FIG. 1). The method 6000 is performed by one of the publisher devices.

At step 6025 the publisher receives a public key from the broker. At query 6031 the publisher determines, based on one or more attributes of data to be published to the broker, whether a sensitivity level of the data is low. Following completion of both of step 6025 and query 6031, the publisher publishes the data to the broker in one of two ways depending on the determination made at query 6031.

When query 6031 results in a determination that the sensitivity level of the data is low, publishing the data to the broker comprises transmitting the data to the broker unencrypted by preparing a publication request packet comprising the unencrypted data at step 6035, then transmitting that packet at step 6045.

When query 6031 results in a determination that the sensitivity level of the data is not low, publishing the data to the broker comprises encrypting the data at step 6043 using the public key. The resulting encrypted data is then transmitted to the broker by preparing a publication request packet comprising the encrypted data at step 6044, then transmitting that packet at step 6045.

Query 6031 can be enacted each time the publisher has data to publish, for that specific data. Alternatively, the sensitivity of various classes of data, defined by one or more attributes, could be determined by enacting query 6031 as part of a setup process so that the determination is made in advance of data being ready to publish. (In that case query 6031 could follow step 6025 or be enacted in parallel with it.) This can speed up the publication process, but would likely require more memory resources overall to store the determination results.

The one or more attributes could comprise one or both of a topic to which the data relates and an application from which the data originates.

The encrypted data could comprise ciphertext and a hash signature. Step 6043 could comprise generating the hash signature by hashing one or more attributes of the publisher with the ciphertext. Those one or more attributes of the publisher could constitute a publisher device profile accessible to the broker. The broker could receive the encrypted data and verify the signature by hashing the publisher profile with the ciphertext and confirming that the result matches the signature received in the encrypted data.

Step 6043 could be performed according to an ABE method.

Figure 7:
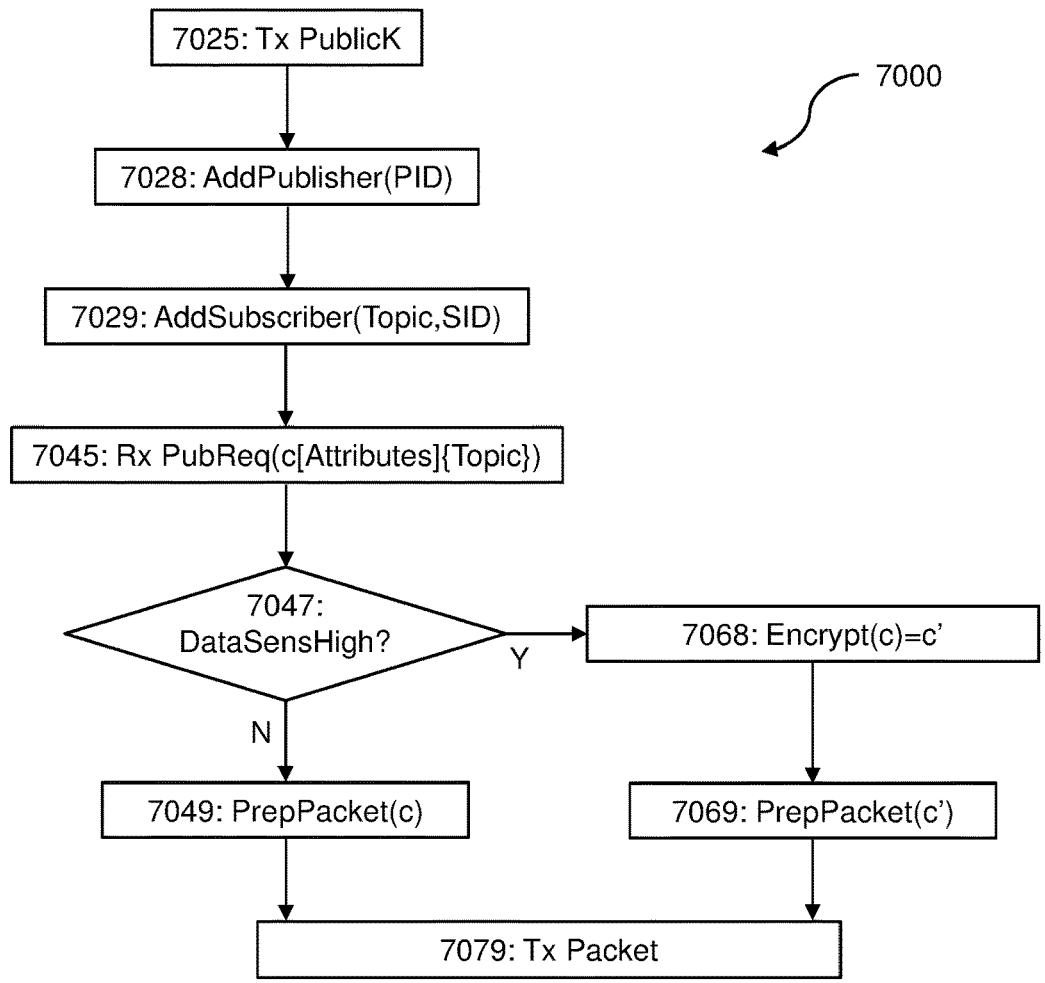

FIG. 7 illustrates an example computer-implemented method 7000 for communicating data in a communications network (such as the network 1100 of FIG. 1) comprising one or more publisher devices (such as the clients 1121 and 1124 of FIG. 1), a broker (such as the server 1110 of FIG. 1) and one or more subscriber devices (such as the clients 1122, 1124 and 1125 of FIG. 1). The method 7000 is performed by the broker. The broker could be a single server or multiple servers in communication with one another with various processing, storage and communication functions distributed amongst them.

At step 7025 the broker transmits a public key to the one or more publisher devices and the one or more subscriber devices. At step 7028 the broker registers one of the publisher devices as a publisher of data so that the publisher device can publish data having one or more attributes, said one or more attributes comprising a topic to which the data relates. At step 7029 the broker registers one of the subscriber devices as a subscriber of data relating to the topic. Steps 7025, 7028 and 7029 could be performed in any order, or two or all of them could be performed in parallel. If step 7025 precedes steps 7028 and 7029 as shown then step 7025 could for example be performed by means of a broadcast transmission. Alternatively, if steps 7028 and 7029 precede step 7025 then step 7025 could comprise transmissions directed at only the register publisher and subscriber devices.

At step 7045 the broker receives a publication request comprising encrypted data relating to the topic from the one of the publisher devices, said encrypted data having been encrypted using a method which comprises using the public key. (Step 7045 must therefore occur after step 7025.) Step 7045 could be performed at a later time than step 7028 as shown. Alternatively, steps 7028 and 7045 could be combined, with the publisher's registration request comprising its first publication request.

At query 7047 the broker determines, based on one or more of said attributes, whether a sensitivity level of the data is high. Query 7047 can be enacted each time the broker receives a request to publish data, for that specific data. Alternatively, the sensitivity of various classes of data, defined by one or more attributes, could be determined by enacting query 7047 as part of a setup process so that the determination is made in advance of data being ready to publish. (In that case query 7047 could be enacted at any time relative to steps 7025, 7028 and 7029.) This can speed up the publication process, but would likely require more memory resources overall to store the determination results.

Following completion of all of steps 7025, 7028, 7029, 7045 and query 7047, the broker publishes the encrypted data to the one of the subscriber devices in one of two ways depending on the determination made at query 7047.

When query 7047 results in a determination that the sensitivity level of the data is not high, publishing the encrypted data comprises preparing a packet for transmission comprising the encrypted data at step 7049, then transmitting the packet to the one of the subscriber devices at step 7079.

When query 7047 results in a determination that the sensitivity level of the data is high, publishing the encrypted data comprises encrypting the encrypted data to produce double-encrypted data at step 7068, preparing a packet for transmission comprising the double-encrypted data at step 7069, then transmitting the packet to the one of the subscriber devices at step 7079.

The one or more attributes on which the determination of query 7047 are based could for example comprise one or both of the topic to which the data relates and an application from which the data originates.

Step 7068 could for example be performed according to an advanced encryption standard (AES) method.

When query 6031 of method 6000 of FIG. 6 results in a determination that the sensitivity level of the data is not low the method 7000 of FIG. 7 could be performed subsequent to the method 6000. That is, the encrypted data received by the broker in step 7045 could be the encrypted data transmitted by the publisher device in step 6045.

One or both of encryption steps 6043 of FIGS. 6 and 7068 of FIG. 7 could for example be performed according to an elliptic curve cryptography (ECC) method.

The attribute-based data security techniques described herein could be used in conjunction with the attribute-based traffic control techniques discussed above.

Attribute-based encryption (ABE) is a type of public key encryption in which the secret key of a user and the ciphertext are dependent upon attributes (e.g. location or device manufacturer). Decryption of the ciphertext is only possible if the set of attributes of the user key matches the attributes of the ciphertext.

A crucial security aspect of ABE is collusion resistance: the private key components are tied to random polynomials in such a way that multiple users are unable to combine them in any way that allows for collusion attacks. An adversary that holds multiple keys is only able to access data if at least one individual key grants access.

Two variants of ABE have been developed: ciphertext-policy ABE (CP-ABE) and key-policy ABE (KP-ABE). The essential difference between the two schemes is whether the attributes relate to the data or the recipient.

In CP-ABE the sender's data access policy is embedded in the ciphertext and the recipient's attributes are associated with its private key. The recipient can decrypt the ciphertext only if the attributes associated with its private key satisfy the access policy embedded in the encrypted data.

In KP-ABE a set of data attributes are embedded in the ciphertext and the access policy to the data is embedded in the recipient's private key. Only if the access policy embedded in the private key matches that of the encrypted data can the recipient decrypt the data.

There are four basic functions in ABE: setup, encrypt, keygen and decrypt. These functions operate differently for CP-ABE and KP-ABE.

The CP-ABE functions are as follows.

Setup
This function generates a public key (PublicK) and an associated secret master key (SMK).

Encrypt
This function encrypts a message (m) with the public key (PublicK) and the sender's access policy (P). It outputs a ciphertext (c) associated with the public key (PublicK) and the access policy (P).

Keygen
This function takes as input the secret master key (SMK), the public key (PublicK) and a set of attributes (A) of the recipient. It outputs a decryption key (DecryptK). This decryption key (DecryptK) is associated with the recipient's attributes (A), the secret master key (SMK) and its public key (PublicK).

Decrypt
This function takes as input the ciphertext (c), the public key (PublicK) and the decryption key (DecryptK). It decrypts the ciphertext (c) to output the message (m), provided the attributes (A) in the private key (DecryptK) satisfy the policy (P) and the decryption key (DecryptK) is associated with the public key (PublicK) that has been used initially for encryption.

The KP-ABE functions are as follows.

Setup
This function is identical to the CP-ABE Setup function. It generates a public key (PublicK) and an associated secret master key (SMK).

Encrypt
This function encrypts a message (m) with the public key (PublicK) and a set of data attributes (A) of the message (m). It outputs a ciphertext (c) associated with the public key (PublicK) and the data attributes (A).

Keygen
This function takes as input the secret master key (SMK), the public key (PublicK) and a data access policy (P). It outputs a decryption key (DecryptK). This decryption key (DecryptK) is associated with the access policy (P), the secret master key (SMK) and its public key (PublicK).

Decrypt
This function takes as input the ciphertext (c), the public key (PublicK) and the decryption key (DecryptK). It decrypts the ciphertext (c) to output the message (m), provided the attributes (A) in the ciphertext (c) satisfy the policy (P) and the decryption key (DecryptK) is associated with the public key (PublicK) that has been used initially for encryption.

ABE performance is highly dependent on the number of attributes used. Encryption in both CP-ABE and KP-ABE requires two exponentiations; in CP-ABE for each attribute in the access policy and in KP-ABE for each attribute enforced on the ciphertext. Decryption complexity depends on the number of attributes n matching the access policy. CP-ABE is upper bounded by n exponentiations and 2n pairing operations, while KP-ABE is upper bounded by n exponentiations and n pairing operations.

ABE is particularly well-suited to publish-subscribe environments since it requires fewer keys to be used than traditional public key encryption.

Figure 8A:
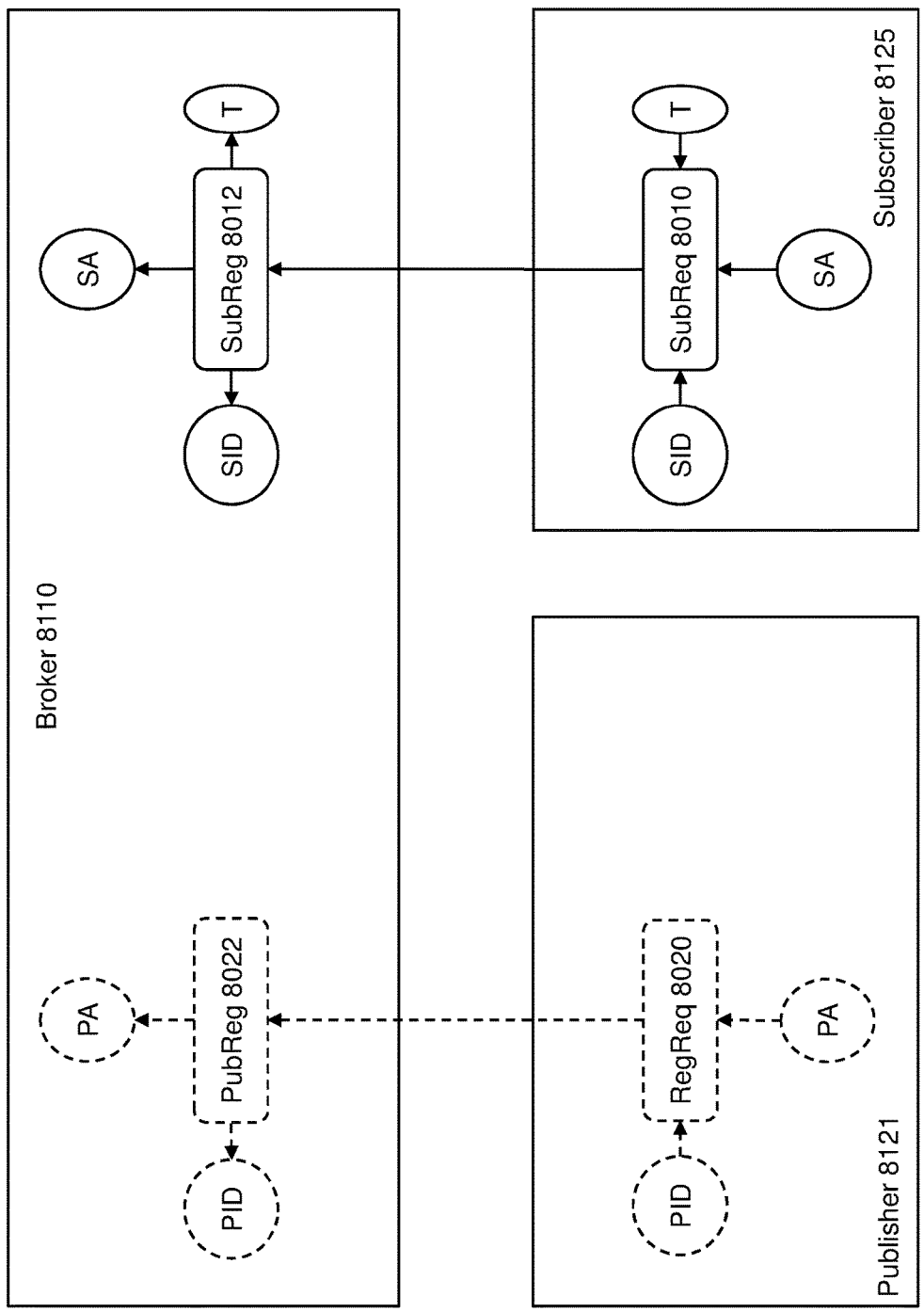
FIGS. 8A, 8B and 8C illustrate an example of how ciphertext-policy attribute-based encryption (CP-ABE) can be implemented in a publish-subscribe network.
Figure 8B:
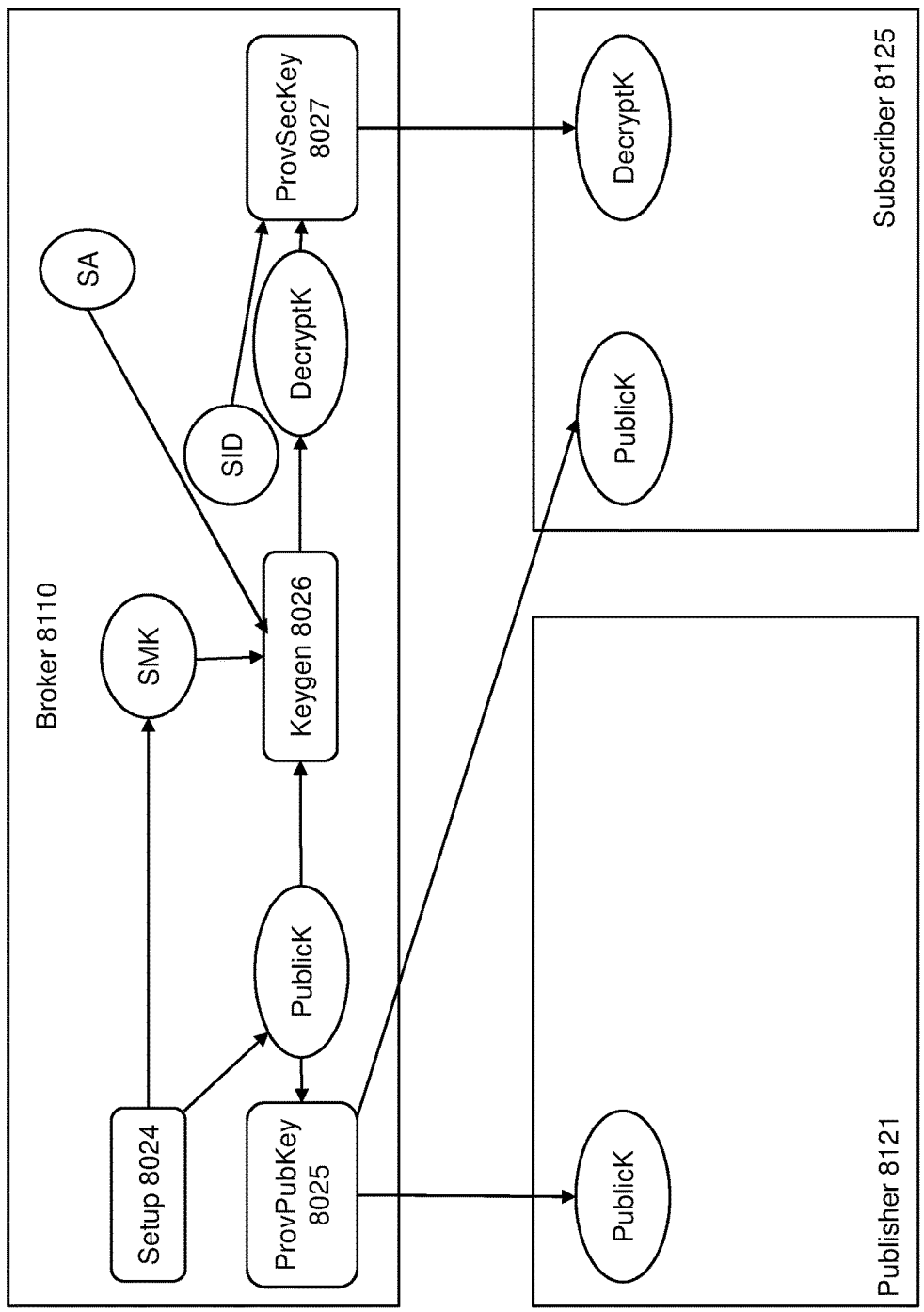
Figure 8C:
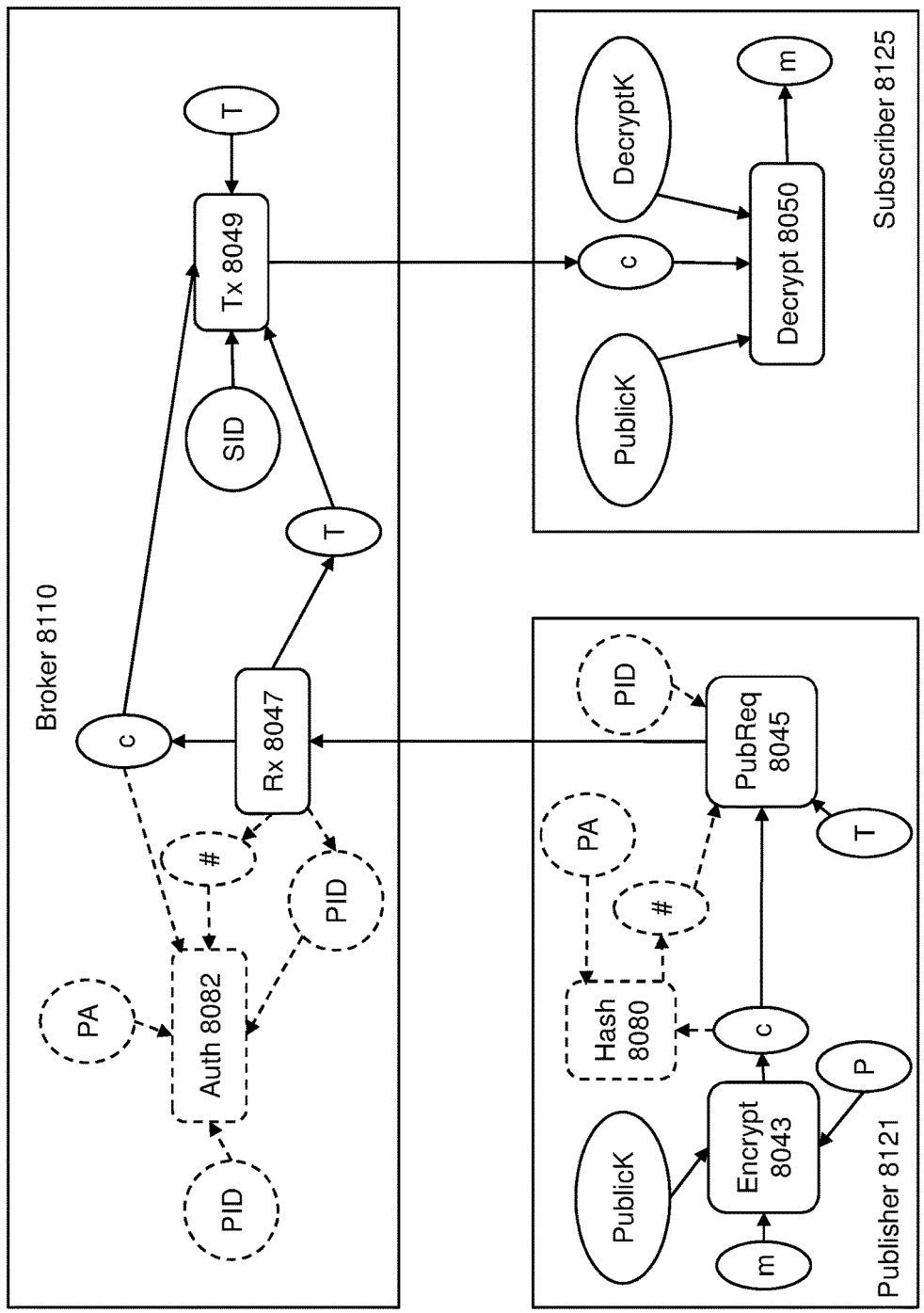

FIGS. 8A to 8C illustrate an example of how CP-ABE can be implemented in a publish-subscribe network for publications from a publisher 8121 to a subscriber 8125 via a broker 8110, where trustworthiness of the broker 8110 can be assumed.

FIG. 8A illustrates an initial registration stage wherein the subscriber 8125 and optionally the publisher 8121 register with the broker 8110.

At step 8010 the subscriber 8125 sends a subscription request to the broker 8110. The subscription request comprises subscriber attributes (SA), a subscriber identifier (SID) and a topic (T) to which the subscription relates. The subscriber attributes (SA) are then stored at the broker 8110, together with the subscriber identifier (SID) and the topic (T).

Registration of the publisher 8121 with the broker 8110 is not strictly required for this CP-ABE method, unless the optional hash signature authentication discussed below in relation to FIG. 8C is to be incorporated. Optional steps 8020 and 8022 are therefore shown in dashed lines. At step 8020 the publisher 8121 sends a registration request to the broker 8110. The registration request comprises publisher attributes (PA). The publisher attributes included in the registration request include a publisher identifier (PID). The publisher attributes (PA) are then stored at the broker 8110, together with the publisher identifier (PID).

FIG. 8B illustrates a key generation and distribution stage which follows the registration stage of FIG. 8A.

At step 8024 the broker 8110 performs the Setup function to generate a public key (PublicK) and secret master key (SMK). At step 8025 the public key (PublicK) is provisioned to both the publisher 8121 and the subscriber 8125, both of which then store the public key (PublicK). (Step 8025 can for example be enacted by means of a broadcast transmission, or could target the publisher 8121 and subscriber 8125 using their respective identifiers (PID, SID).) At step 8026 the broker 8110 performs the KeyGen function using the public key (PublicK) and the secret master key (SMK), as well as the subscriber attributes (SA) in order to generate a secret decryption key (DecryptK) for the subscriber 8125. At step 8027 the broker 8110 transmits the secret decryption key (DecryptK) to the subscriber 8125, using the subscriber identifier (SID) to address the transmission. The subscriber 8125 then stores the secret decryption key (DecryptK).

FIG. 8C illustrates a publication stage which follows the key generation and distribution stage of FIG. 8B.

At step 8043 the publisher 8121 encrypts a message (m) using the public key (PublicK) previously received from the broker 8110 as described above in relation to FIG. 8B. The encryption process embeds the publisher's data access policy (P) in the resulting ciphertext (c). (The data access policy (P) could for example be topic-dependent.) That ciphertext (c) is then transmitted from the publisher 8121 to the broker 8110, along with the topic (T) to which the message (m) relates in publication request step 8045.

The broker 8110 receives the publication request at step 8047. The ciphertext (c) and topic (T) are extracted by the broker 8110, which checks the topic (T) for subscribers and finds the identifier (SID) of subscriber 8125 stored together with the topic (T) as a result of the subscriber registration 8012 of FIG. 8A. The ciphertext (c) is therefore transmitted from the broker 8110 to the subscriber 8125 at step 8049.

At step 8050 the subscriber 8125 decrypts the ciphertext (c) received from the broker 8110, using the public key (PublicK) and the secret decryption key (DecryptK) previously received from the broker 8110 as described above in relation to FIG. 8B. This decryption works to output the message (m) since the subscriber attributes (SA) used to generate the secret decryption key (DecryptK) in step 8026 of FIG. 8B satisfy the data access policy (P) embedded in the ciphertext (c) by the encryption step 8043.

Attributes can be immutable, i.e. not expected/permitted to change for the lifetime of the interaction (e.g. the brand and model of a device), or mutable, i.e. expected to change (e.g. the location of a mobile device). If the subscriber attributes and/or the publisher's data access policy were to change in such a way that the subscriber attributes no longer satisfied the publisher's data access policy then any subsequent publications by the publisher could not be successfully decrypted by the subscriber. Therefore, new keys need not be generated and distributed to accommodate such changes.

As shown using dashed lines in FIG. 8C, an optional authentication of the publication request could be performed using a hash signature. The publisher 8121 could hash the publisher attributes (PA) with the ciphertext (c) at step 8080 to produce a hash signature (#) which is incorporated into the publication request 8045 along with the publisher identifier (PID). The ciphertext (c), hash signature (#) and the publisher identifier (PID) are then extracted by the broker 8110 on receipt of the publication request at step 8047. At authentication step 8082 the broker 8110 looks up the publisher attributes (PA) it has stored with the publisher ID (PID) as a result of the publisher registration 8022 of FIG. 8A. The publisher attributes (PA) are then hashed with the ciphertext (c) extracted from the publication request to confirm that the result matches the hash signature (#) extracted from the publication request. If so, step 8049 proceeds as described above. If not, the publication request is denied, optionally with a publication denial being transmitted from the broker 8110 to the publisher 8121. Use of a hash signature in this way provides an assurance of data integrity since if the ciphertext is tampered with by a party intercepting its transmission from the publisher 8121 to the broker 8110, the hash in the message received by the broker 8110 will not match that produced by the broker 8110 during step 8082.

This kind of CP-ABE could be implemented as the encryption technique used in the attribute-based data security methods described above, for example with encryption step 5043 of FIG. 5B mapping to encryption step 8043 of FIG. 8C.

The publisher attributes (PA) and subscriber attributes (SA) referred to in relation to FIGS. 8A to 8C could correspond to the client profiles described above in relation to attribute-based traffic control techniques. Such attribute-based traffic control techniques could be used in conjunction with the CP-ABE scheme of FIGS. 8A to 8C for improved security. For example, the publication request 3030 of FIG. 3 could correspond to the publication request 8045 of FIG. 8C.

Figure 9A:
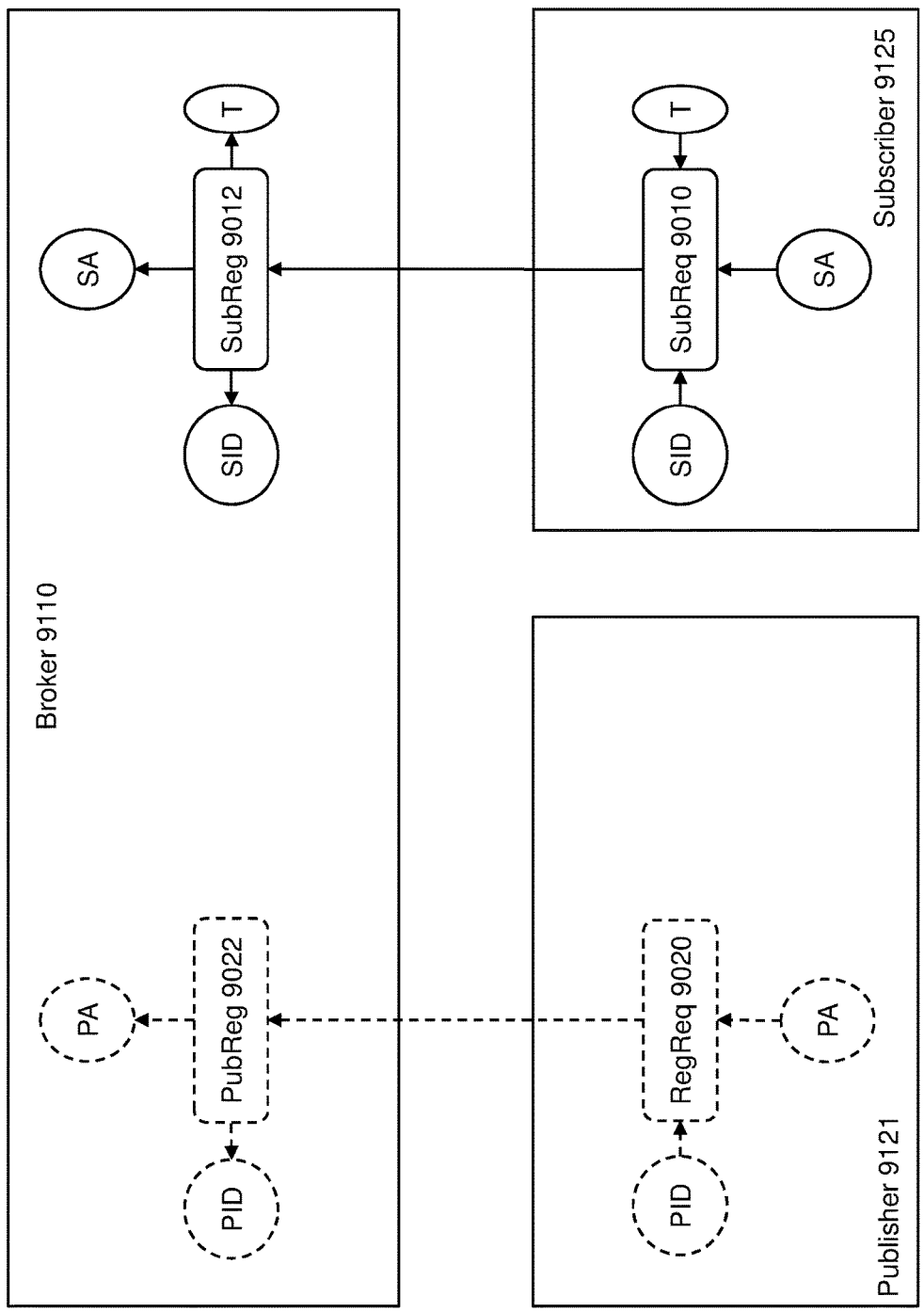
FIGS. 9A to 9C illustrate an example of how key-policy attribute-based encryption (KP-ABE) can be implemented in a publish-subscribe network.
Figure 9B:
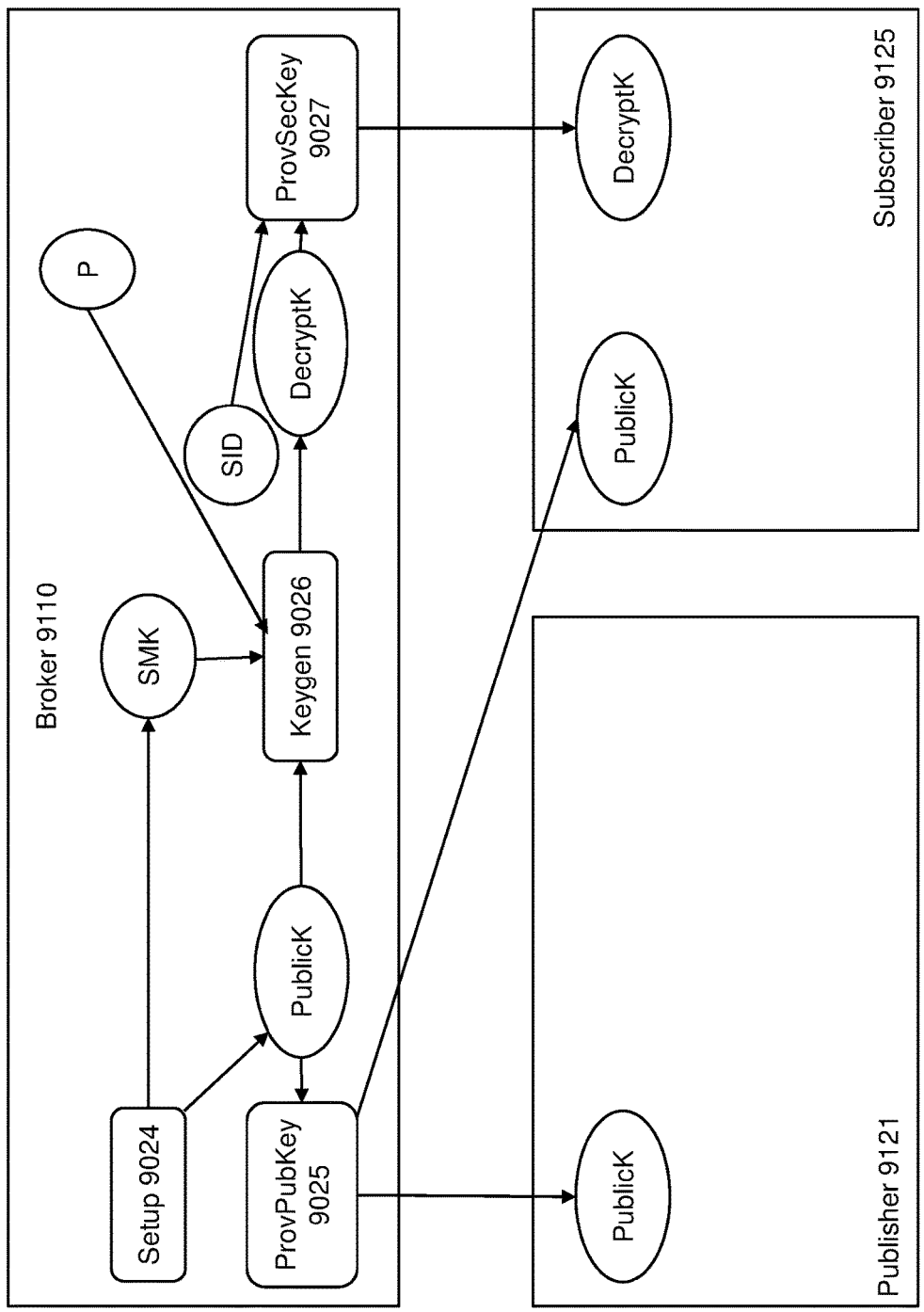
Figure 9C:
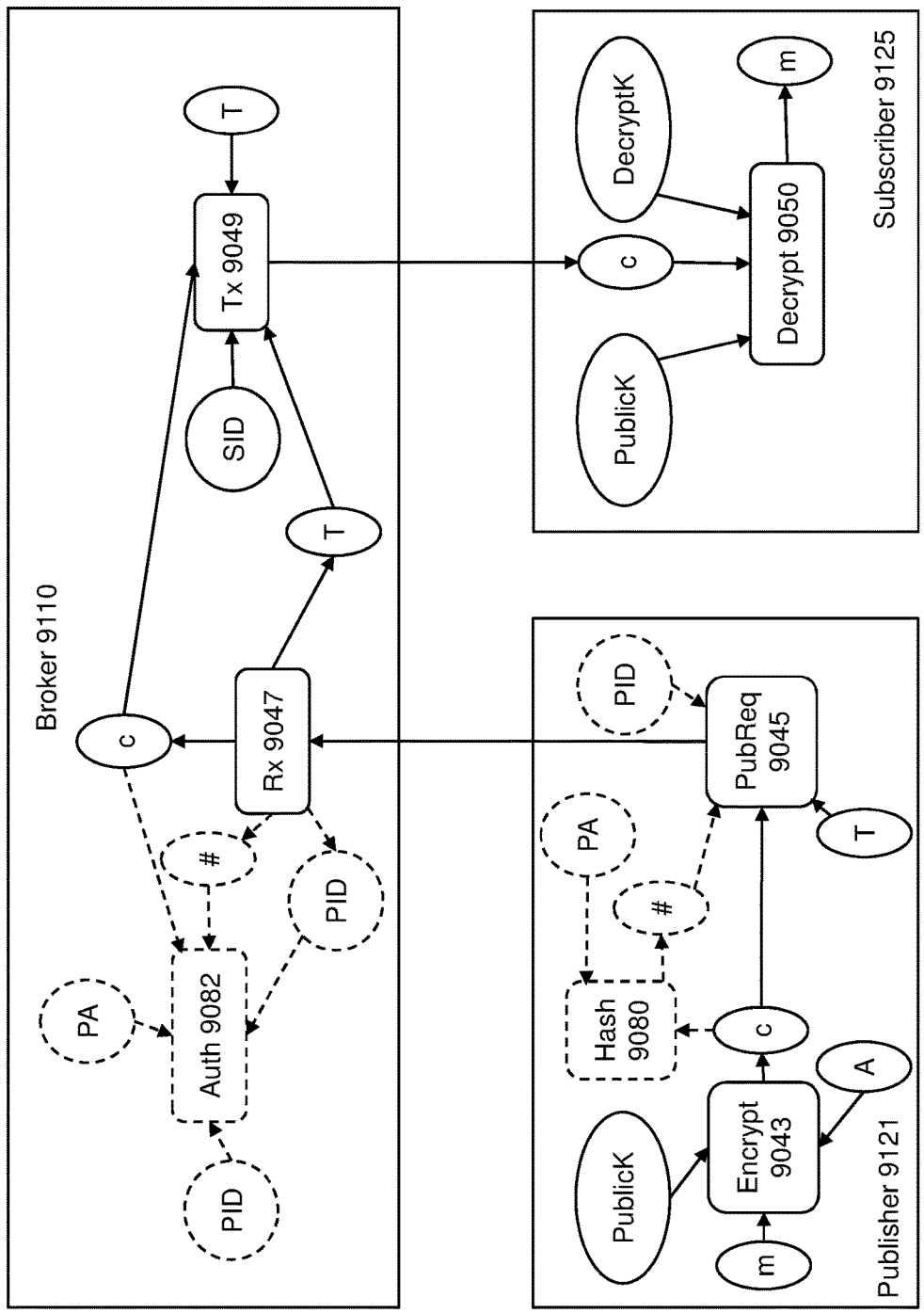

FIGS. 9A to 9C illustrate an example of how KP-ABE can be implemented in a publish-subscribe network for publications from a publisher 9121 to a subscriber 9125 via a broker 9110, where trustworthiness of the broker 9110 can be assumed.

FIG. 9A illustrates an initial registration stage wherein the subscriber 9125 and optionally the publisher 9121 register with the broker 9110.

At step 9010 the subscriber 9125 sends a subscription request to the broker 9110. The subscription request comprises subscriber attributes (SA), a subscriber identifier (SID) and a topic (T) to which the subscription relates. The subscriber attributes (SA) are then stored at the broker 9110, together with the subscriber identifier (SID) and the topic (T).

Registration of the publisher 9121 with the broker 9110 is not strictly required for this KP-ABE method, unless the optional hash signature authentication discussed below in relation to FIG. 9C is to be incorporated. Optional steps 9020 and 9022 are therefore shown in dashed lines. At step 9020 the publisher 9121 sends a registration request to the broker 9110. The registration request comprises publisher attributes (PA). The publisher attributes included in the registration request include a publisher identifier (PID). The publisher attributes (PA) are then stored at the broker 9110, together with the publisher identifier (PID).

FIG. 9B illustrates a key generation and distribution stage which follows the registration stage of FIG. 9A.

At step 9024 the broker 9110 performs the Setup function to generate a public key (PublicK) and secret master key (SMK). At step 9025 the public key (PublicK) is provisioned to both the publisher 9121 and the subscriber 9125, both of which then store the public key (PublicK). (Step 9025 can be enacted by means of a broadcast transmission or could target the publisher 9121 and subscriber 9125 using their respective identifiers (PID, SID).) At step 9026 the broker 9110 performs the KeyGen function using the public key (PublicK) and the secret master key (SMK), incorporating a data access policy (P) in order to generate a secret decryption key (DecryptK) for the subscriber 9125.

The data access policy (P) could for example be topic-dependent. It could be set by the publisher 9121 then communicated to the broker 9110 in advance of step 9026, for example as part of step 9020. Alternatively, the policy (P) could be set by the broker 9110 and either provisioned to the publisher 9121 during deployment or together with the public key (PublicK) in step 9025.

At step 9027 the broker 9110 transmits the secret decryption key (DecryptK) to the subscriber 9125, using the subscriber identifier (SID) to address the transmission. The subscriber 9125 then stores the secret decryption key (DecryptK).

FIG. 9C illustrates a publication stage which follows the key generation and distribution stage of FIG. 9B.

At step 9043 the publisher 9121 encrypts a message (m) using the public key (PublicK) previously received from the broker 9110 as described above in relation to FIG. 9B. The encryption process embeds data attributes (A) of the message (m) in the resulting ciphertext (c). That ciphertext (c) is then transmitted from the publisher 9121 to the broker 9110, along with the topic (T) to which the message (m) relates in publication request step 9045.

The broker 9110 receives the publication request at step 9047. The ciphertext (c) and topic (T) are extracted by the broker 9110, which checks the topic (T) for subscribers and finds the identifier (SID) of subscriber 9125 stored together with the topic (T) as a result of the subscriber registration 9012 of FIG. 9A. The ciphertext (c) is therefore transmitted from the broker 9110 to the subscriber 9125 at step 9049.

At step 9050 the subscriber 9125 decrypts the ciphertext (c) received from the broker 9110, using the public key (PublicK) and the secret decryption key (DecryptK) previously received from the broker 9110 as described above in relation to FIG. 9B. This decryption works to output the message (m) since the data access policy (P) used to generate the secret decryption key (DecryptK) in step 9026 of FIG. 9B is satisfied by the data attributes (A) embedded in the ciphertext (c) by the encryption step 9043.

If the data attributes and/or the data access policy were to change in such a way that the data attributes no longer satisfied the data access policy then any subsequent publications by the publisher could not be successfully decrypted by the subscriber. Therefore, new keys need not be generated and distributed to accommodate such changes.

As shown using dashed lines in FIG. 9C, an optional authentication of the publication request could be performed using a hash signature. The publisher 9121 could hash the publisher attributes (PA) with the ciphertext (c) at step 9080 to produce a hash signature (#) which is incorporated into the publication request 9045 along with the publisher identifier (PID). The ciphertext (c), hash signature (#) and the publisher identifier (PID) are then extracted by the broker 9110 on receipt of the publication request at step 9047. At authentication step 9082 the broker 9110 looks up the publisher attributes (PA) it has stored with the publisher ID (PID) as a result of the publisher registration 9022 of FIG. 9A. The publisher attributes (PA) are then hashed with the ciphertext (c) extracted from the publication request to confirm that the result matches the hash signature (#) extracted from the publication request. If so, step 9049 proceeds as described above. If not, the publication request is denied, optionally with a publication denial being transmitted from the broker 9110 to the publisher 9121. Use of a hash signature in this way provides an assurance of data integrity since if the ciphertext is tampered with by a party intercepting its transmission from the publisher 9121 to the broker 9110, the hash in the message received by the broker 9110 will not match that produced by the broker 9110 during step 9082.

This kind of KP-ABE could be implemented as the encryption technique used in the attribute-based data security methods described above, for example with encryption step 5043 of FIG. 5B mapping to encryption step 9043 of FIG. 9C.

The publisher attributes (PA) and subscriber attributes (SA) referred to in relation to FIGS. 9A to 9C could correspond to the client profiles described above in relation to attribute-based traffic control techniques. Such attribute-based traffic control techniques could be used in conjunction with the KP-ABE scheme of FIGS. 9A to 9C for improved security. For example, the publication request 3030 of FIG. 3 could correspond to the publication request 9045 of FIG. 9C.

Similarly to the attribute-based traffic control techniques described above, the CP-ABE and KP-ABE techniques described herein are more effective the greater the number of attributes used in making security decisions, i.e. specified by the data access policy.

Chain of Trust Mechanism

As explained above in relation to FIG. 1, if the broker 1110 of a publish-subscribe communication network 1100 receives a subscription request from an external client 1221, 1222 not within the trusted network 1100, the subscription request is by default refused. According to the present disclosure however, it is possible to extend trust to an external client in a secure way. This is achieved using a one-time password (OTP) to build a secure chain of trust.

Various scenarios where such a chain of trust mechanism can be implemented can be envisaged. One example is in the in-home elderly care context. A health monitoring device worn by an elderly patient could publish data to an MQTT broker, e.g. relating to the topic blood pressure. A caregiver can access the blood pressure data through their smartphone, which is a subscriber to the topic blood pressure.

In this example, the smartphone was able to register a subscription to the broker while they were both connected to the same home WiFi network, since the broker is configured to trust devices on that network. However, should the patient's doctor wish to subscribe to the topic blood pressure from a PC in the local hospital, the broker first needs to be taught to trust that PC. This can be achieved by means of an OTP requested by the smartphone from the broker.

When the smartphone registers its own subscription with the broker, they synchronise a timer or counter between them, agreeing that it will be moved on according to a particular pattern each time an OTP is generated. In this way, the smartphone can verify the validity of an OTP generated and provided by the broker in response to the smartphone's request. The OTP can then be sent through a secure channel (e.g. transport layer security, TLS) to the doctor's PC. The PC can then send a subscription request to the broker, including the OTP. The broker verifies that the OTP is the same one it issued and registers the PC's subscription accordingly.

Another example implementation scenario is a car monitoring system where the car's central processing unit (CPU) acts as a broker, receiving publication requests from various sensors and forwarding the data to the owner's tablet. For example, the tablet may be a subscriber to the topic tyre pressure. The CPU is configured to be paired with the new owner's device at the time of purchase, and not to accept other subscription requests. The car owner can provide access to tyre pressure data to a car repair service by using the tablet to request an OTP from the CPU for the topic tyre pressure, verifying the OTP received in response and forwarding it securely to the car repair service's PC.

Figure 10A:
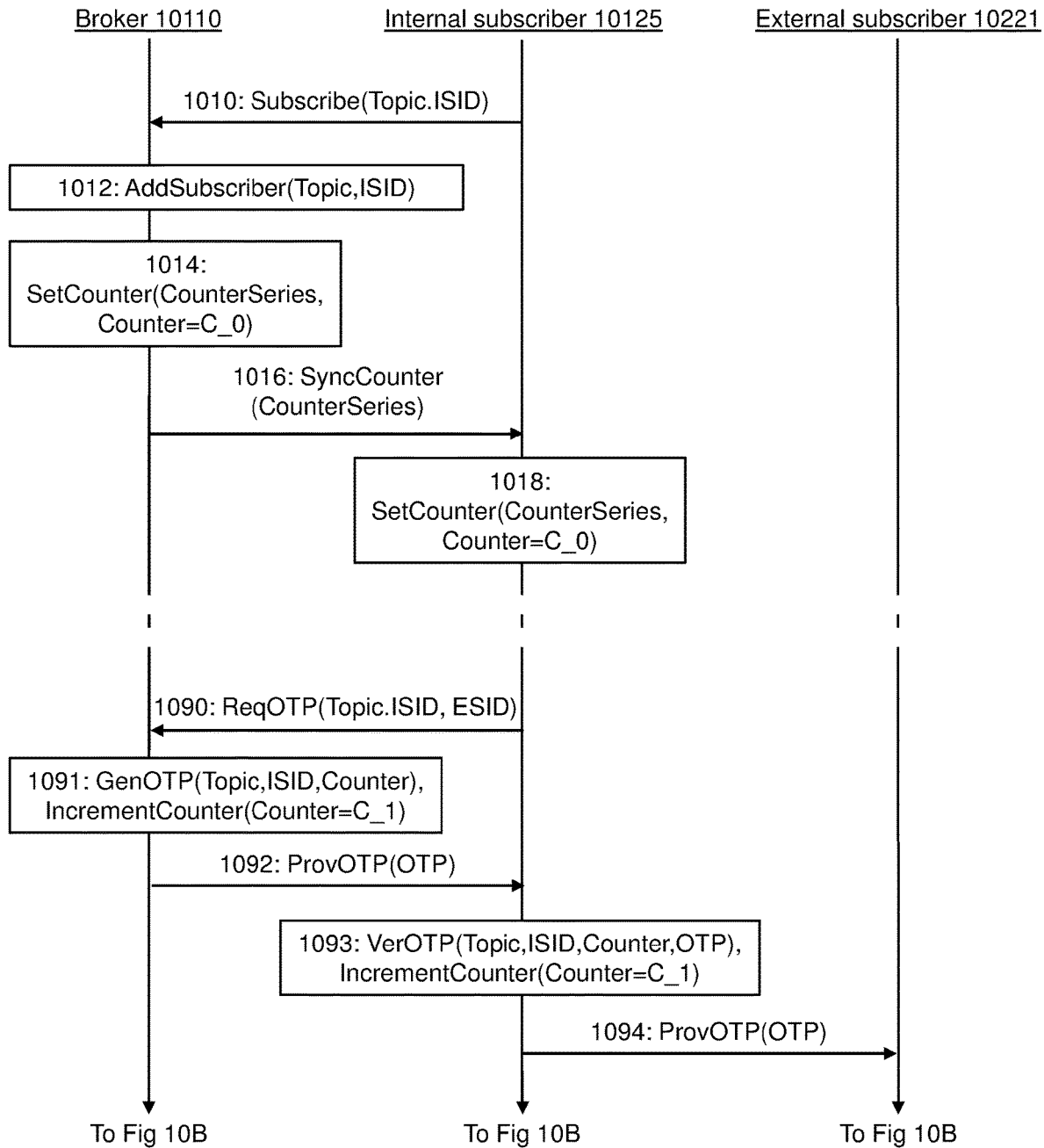
FIGS. 10A and 10B illustrate an example message flow to build a chain of trust.
Figure 10B:
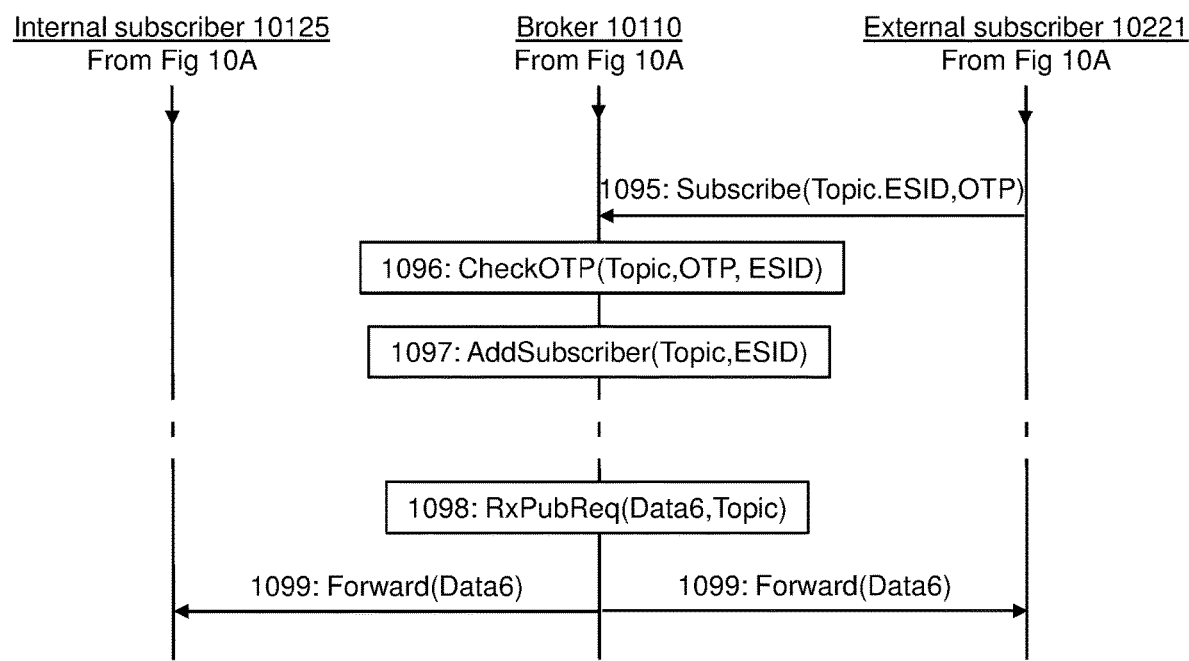

FIGS. 10A and 10B illustrate an example message flow to build a chain of trust from a broker 10110, through a subscriber 10125 internal to the broker's trusted communication network, to an external subscriber 10221.

At step 1010 of FIG. 10A the internal subscriber 10125 sends a subscription request to the broker 10110 to subscribe to publications relating to a topic. The broker 10110 registers the subscription at step 1012, storing the internal subscriber 10125's identifier along with the topic. The broker also initialises a counter series at step 1014, then transmits the counter series (or parameters enabling calculation of it) to the internal subscriber 10125 at step 1016. The internal subscriber 10125 initialises its own counter accordingly at step 1018.

At a later time, the internal subscriber 10125 wishes to extend its subscription to the topic to an external subscriber 10221. Therefore at step 1090 the internal subscriber 10125 requests an OTP for the external subscriber 10221, relating to the topic, from the broker 10110. The broker 10110 then generates an OTP at step 1091, based on the topic and the internal subscriber's identifier, incrementing the counter at the same time. The broker 10110 then provides the OTP to the internal subscriber 10125 at step 1092. At step 1093 the internal subscriber 10125 verifies the OTP received from the broker at step 1092 by generating an OTP independently based on its own identifier and the topic it wishes to extend its subscription to then checking the generated and received OTPs match, incrementing its counter at the same time. The internal subscriber 10125 then transmits the OTP to the external subscriber 10221 at step 1094.

Turning to FIG. 10B, where the broker 10110 and internal subscriber 10125 have switched locations on the page relative to FIG. 10A, in response to receiving the OTP at step 1094, at step 1095 the external subscriber 10221 sends a subscription request to the broker 10110. This subscription request comprises the topic, the external subscriber 10221's identifier and the OTP. At step 1096 the broker 10110 confirms that the OTP received from the external subscriber 10221 at step 1095 matches the OTP it generated at step 1091 of FIG. 10A, and that the external subscriber 10221 the OTP is received from is the same external subscriber 10221 identified by the internal subscriber 10125 in the OTP request the broker 10110 received at step 1090. It then registers the external subscriber 10221's subscription to the topic at step 1097, storing the external subscriber's identifier together with the topic.

At a later time, the broker 10110 receives a publication request comprising data relating to the topic to which the internal subscriber 10125 and external subscriber 10221 have subscribed from a publisher (not shown). The broker 10110 then forwards the data on to both the internal subscriber 10125 and the external subscriber 10221 at step 1099.

Although FIGS. 10A and 10B only refer to a single topic, a chain of trust can be built for multiple topics at a time, either with one OTP per topic or a single OTP for all the requested topics. The requested topics can be one or more of the topics to which the internal subscriber is subscribed (but not any other topics).

The OTPs used can for example be 6-8 bit. They can be based on the subscriber's identity and the requested topic. They can be time-limited; for example, the broker can be configured, on receipt of an external connection request comprising an OTP, to check if the received OTP matches any OTP it has generated in a predetermined recent time period, e.g. in the past hour.

The external subscription itself can be limited, with the broker being configured to unsubscribe the external subscriber after a predetermined time period or predetermined number of publications.

The broker can be configured to add a layer of encryption to publications directed at external subscribers.

Figure 11:
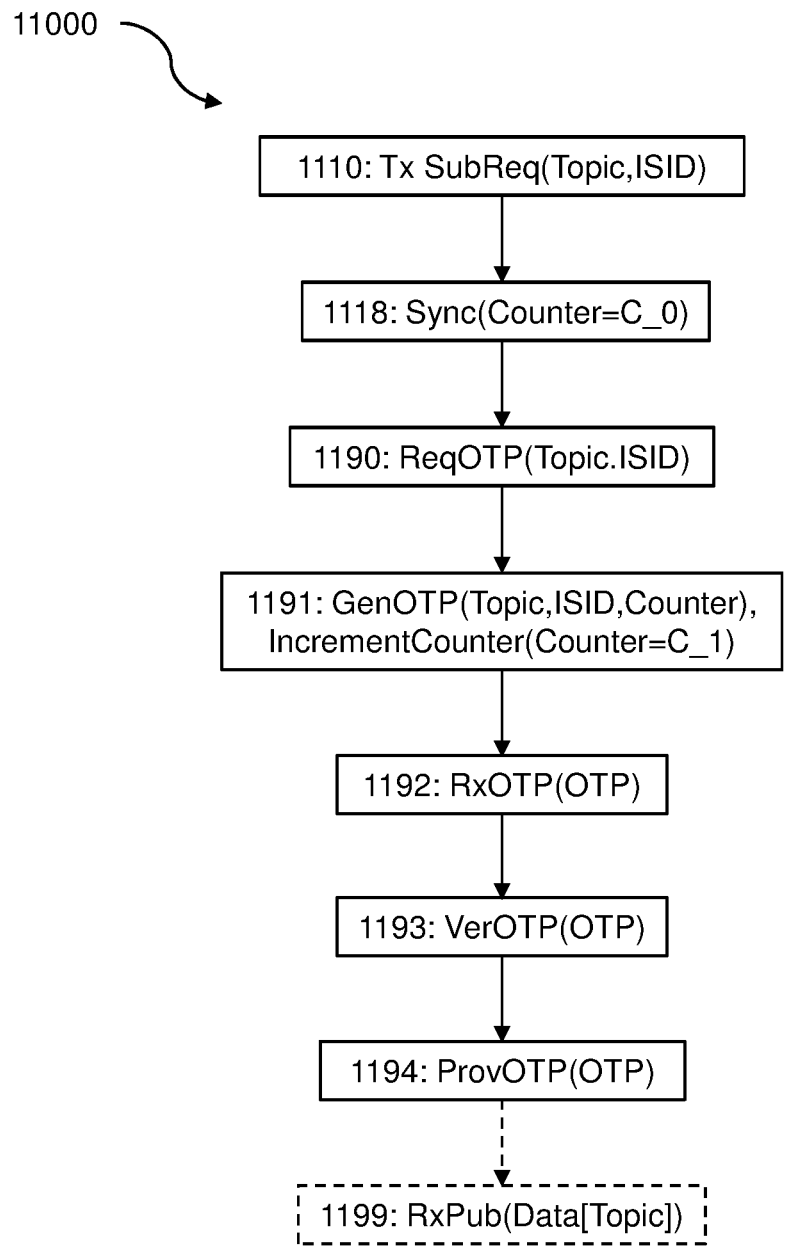
FIGS. 11 and 12 illustrate example computer-implemented methods for securing communication of data from a trusted communications network.

FIG. 11 illustrates an example computer-implemented method 11000 for securing communication of data from a trusted communications network (such as the network 1100 of FIG. 1) comprising one or more publisher devices (such as the clients 1121 and 1124 of FIG. 1), a broker (such as the server 1110 of FIG. 1) and one or more subscriber devices (such as the clients 1122, 1124 and 1125 of FIG. 1). The method 11000 is performed by one of the one or more subscriber devices.

First, the subscriber registers a subscription to publications relating to a particular topic with the broker, said registering step comprising transmitting a subscription request to the broker at step 1110 and synchronising a counter or timer with the broker according to an OTP protocol at step 1118.

Subsequently, at step 1190 the subscriber requests an OTP from the broker to extend the subscription to an external device not comprised in the trusted communications network. The OTP request specifies the topic the subscription is requested for and identifies the internal subscriber so that the broker can confirm that the internal subscriber has a subscription registered for that topic. The OTP request could optionally also include one or more attributes of the external subscriber which the broker can use to confirm the OTP is coming from the correct device.

At step 1191 the subscriber generates a subscriber OTP according to the protocol. At step 1192 the subscriber receives a broker OTP from the broker. Steps 1191 and 1192 could be performed in either order or in parallel with one another. At step 1193 the subscriber confirms that the broker OTP and the subscriber OTP match. Responsive thereto, the subscriber transmits the broker OTP to the external device at step 1194.

The subscriber can receive a publication from one of the one or more publication devices, via the broker, at optional step 1199. Optional step 1199 can occur any time after registration of the subscriber's subscription with the broker.

The broker OTP can for example be transmitted to the external device over a secure TLS, or secure socket layer (SSL) channel or an internet protocol security (IPsec) connection.

Figure 12:
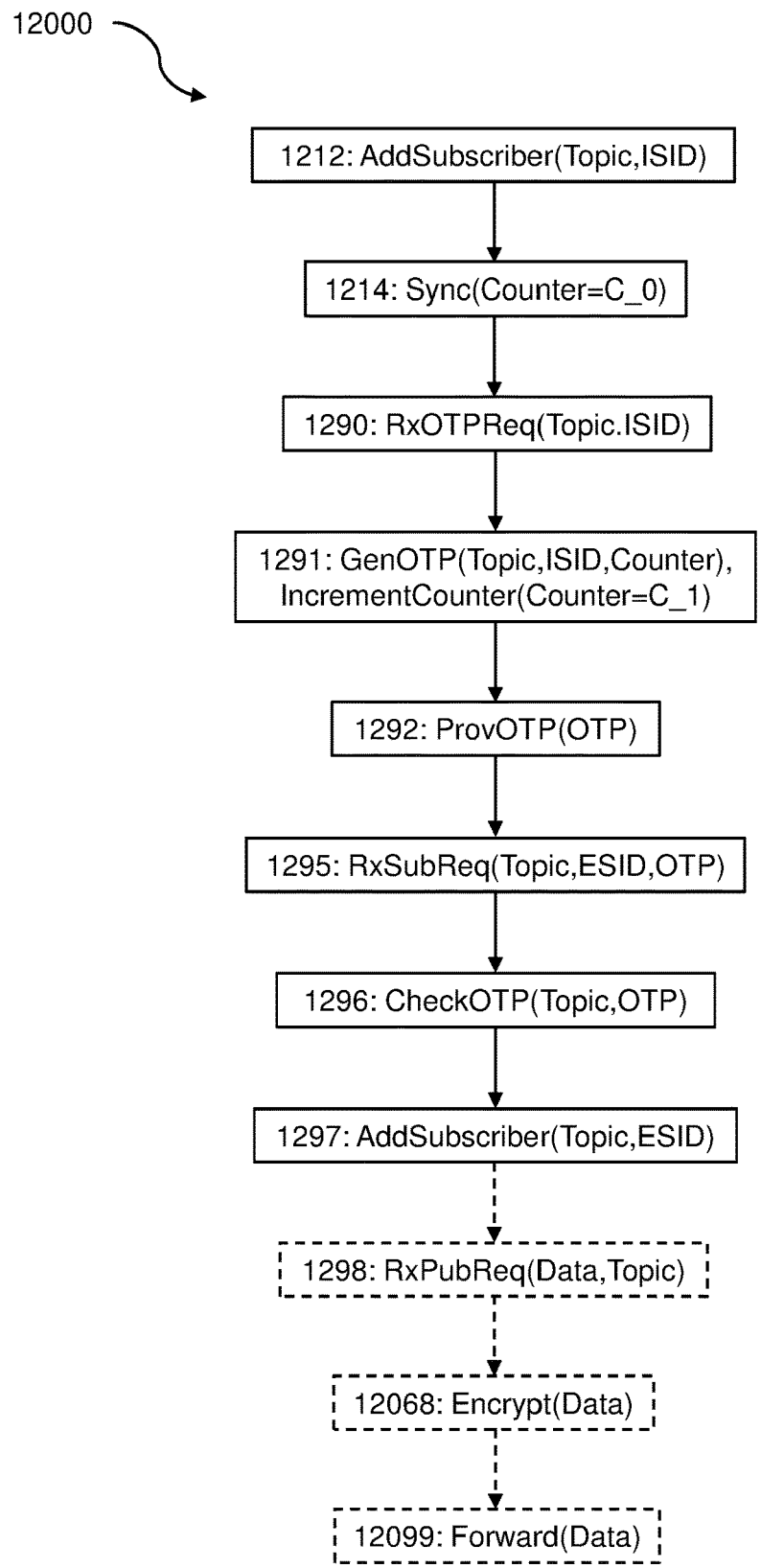

FIG. 12 illustrates an example computer-implemented method 12000 for securing communication of data from a trusted communications network (such as the network 1100 of FIG. 1) comprising one or more publisher devices (such as the clients 1121 and 1124 of FIG. 1), a broker (such as the server 1110 of FIG. 1) and one or more subscriber devices (such as the clients 1122, 1124 and 1125 of FIG. 1). The method 12000 is performed by the broker. The broker could be a single server or multiple servers in communication with one another with various processing, storage and communication functions distributed amongst them.

First, the broker registers a subscription of one of the one or more subscriber devices to publications relating to a topic. The registering step comprises receiving a subscription request from the one of the subscriber devices at step 1212 and synchronising a counter or timer with the one of the subscriber devices according to an OTP protocol at step 1214.

Subsequently, at step 1290 the broker receives an OTP request from the one of the subscriber devices to extend the subscription to an external device not comprised in the trusted communications network. The OTP request specifies the topic the subscription is requested for and identifies the internal subscriber so that the broker can confirm that the internal subscriber has a subscription registered for that topic. The OTP request could optionally also include one or more attributes of the external device which the broker can use to confirm the OTP is coming from the correct device, for example an external device identifier.

Responsive to step 1290, at step 1291 the broker generates a broker OTP according to the protocol. Responsive thereto, at step 1292 the broker transmits the broker OTP to the one of the subscriber devices.

Subsequently, at step 1295 the broker receives a subscription request from the external device, said subscription request comprising an external device OTP. Responsive thereto, at step 1296 the broker confirms that the broker OTP and the external device OTP match. Responsive thereto, at step 1297 the broker registers a subscription of the external device to publications relating to the topic. If the OTP request of step 1290 included one or more attributes of the external device (e.g. its identifier) then these can also be included in the subscription request of step 1295. In that case, step 1296 can also comprise confirming that both sets of external device attributes match for additional security.

The broker can later receive a publication request from one of the one or more publisher devices at optional step 1298, said publication request being for a publication relating to the topic. Responsive thereto, at optional step 12099, the broker can transmit the publication to the one of the subscriber devices and the external device.

Optionally, the broker can encrypt data received in the publication request at step 12068 before transmitting it to the external device, for example according to one of the attribute-based data security methods discussed above.

The OTP protocols of FIGS. 11 and 12 can for example use either the hash-based message authentication codes (HMAC based OTP, HOTP) algorithm or the time-based OTP (TOTP) algorithm.

The chain of trust mechanism described herein can be used in conjunction with the attribute-based traffic control methods and/or the attribute-based security methods described above.

Example Publication Method Through Chain of Trust with Attribute-Based Traffic Control and Data Security FIGS. 13A, 13B, 13C, 13D, 13E and 13F illustrate an example message flow which brings together many of the techniques described above.

Figure 13A:
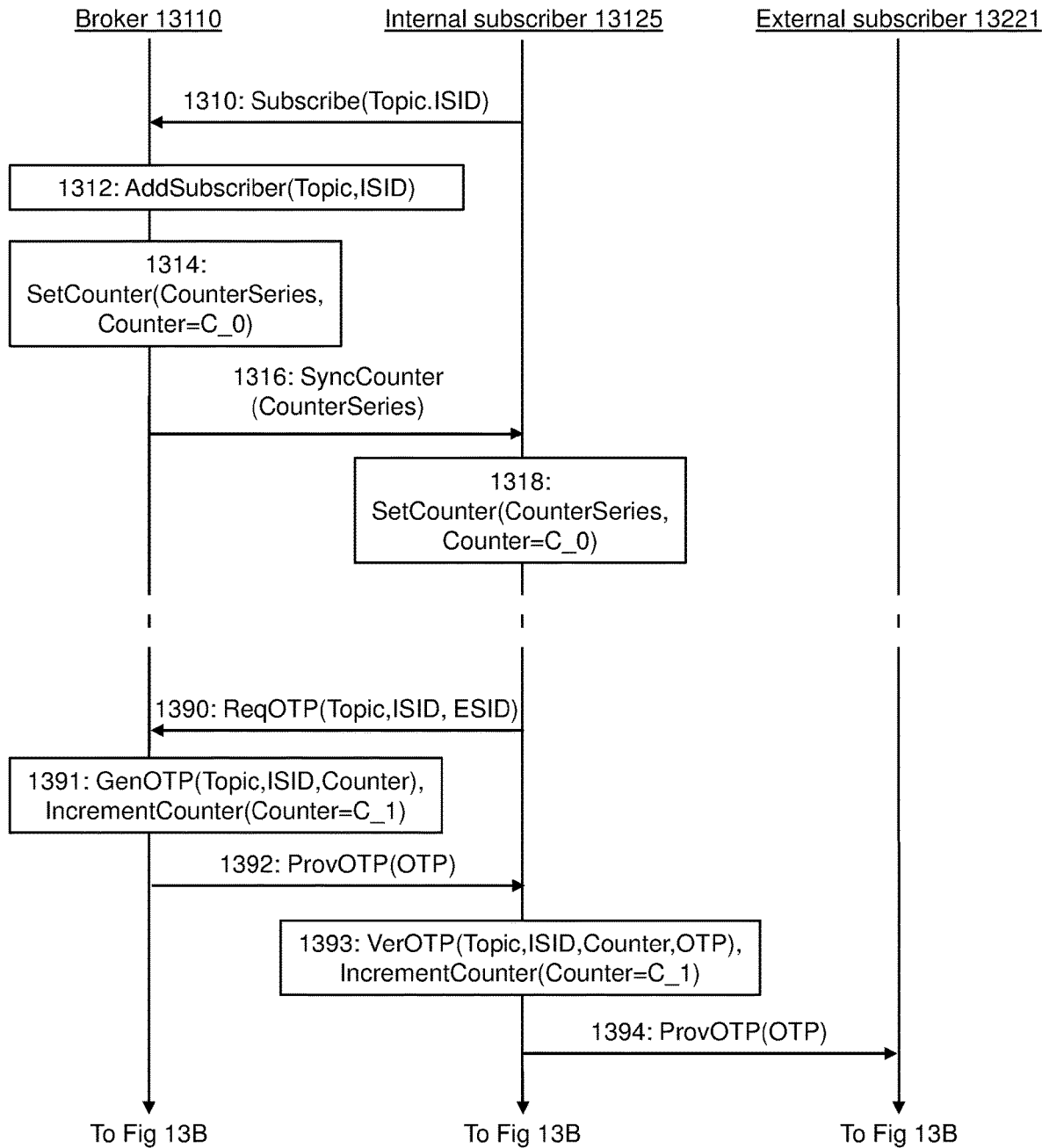
FIGS. 13A, 13B, 13C, 13D, 13E and 13F illustrate an example message flow which implements some of the techniques described herein.
Figure 13B:
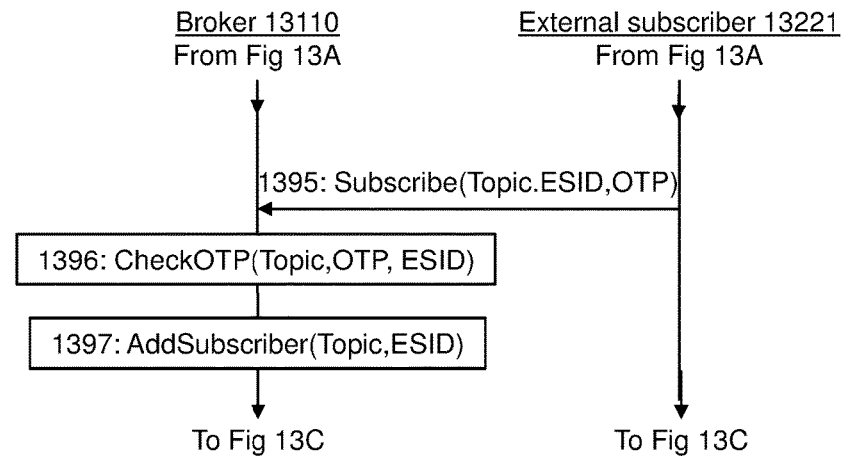

FIGS. 13A and 13B illustrate an example message flow to build a chain of trust from a broker 13110, through a subscriber 13125 internal to the broker's trusted communication network, to an external subscriber 13221. Steps 1310 to 1318 respectively correspond to steps 1010 to 1018 of FIG. 10A. Steps 1390 to 1397 respectively correspond to steps 1090 to 1097 of FIGS. 10A and 10B.

Figure 13C:
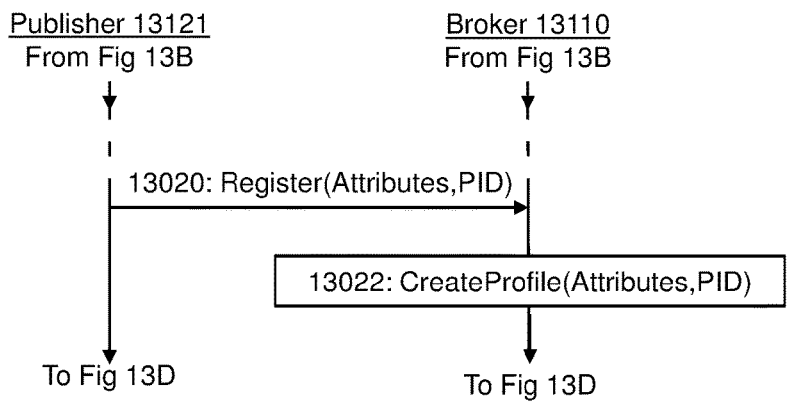

FIG. 13C illustrates registration of a publisher 13121 with the broker 13110, including the broker 13110 storing a profile for the publisher 13121. Steps 13020 and 13022 respectively correspond to steps 3020 and 3022 of FIG. 3 and can be performed before, after or in parallel with the steps of FIGS. 13A and 13B.

Figure 13D:
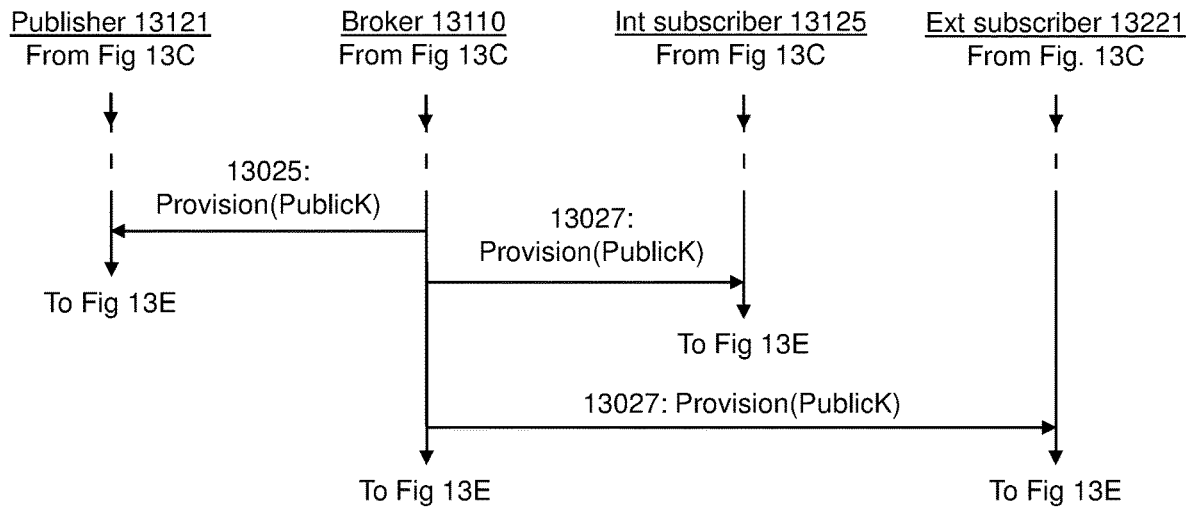

FIG. 13D illustrates provision of the broker 13110's public key to the publisher 13121 (at step 13025) and both the internal subscriber 13125 and external subscriber 13221 (at step 13027). Steps 13025 and 13027 respectively correspond to steps 5025 and 5027 of FIG. 5A. The method of FIG. 13D can be performed at any time before the publisher 13121 wishes to start publishing data if the key provisioning is done via broadcast, but must wait until the methods of FIGS. 13A to 13C have been completed if clients 13121, 13125 and 13221 are to be addressed directly.

Figure 13E:
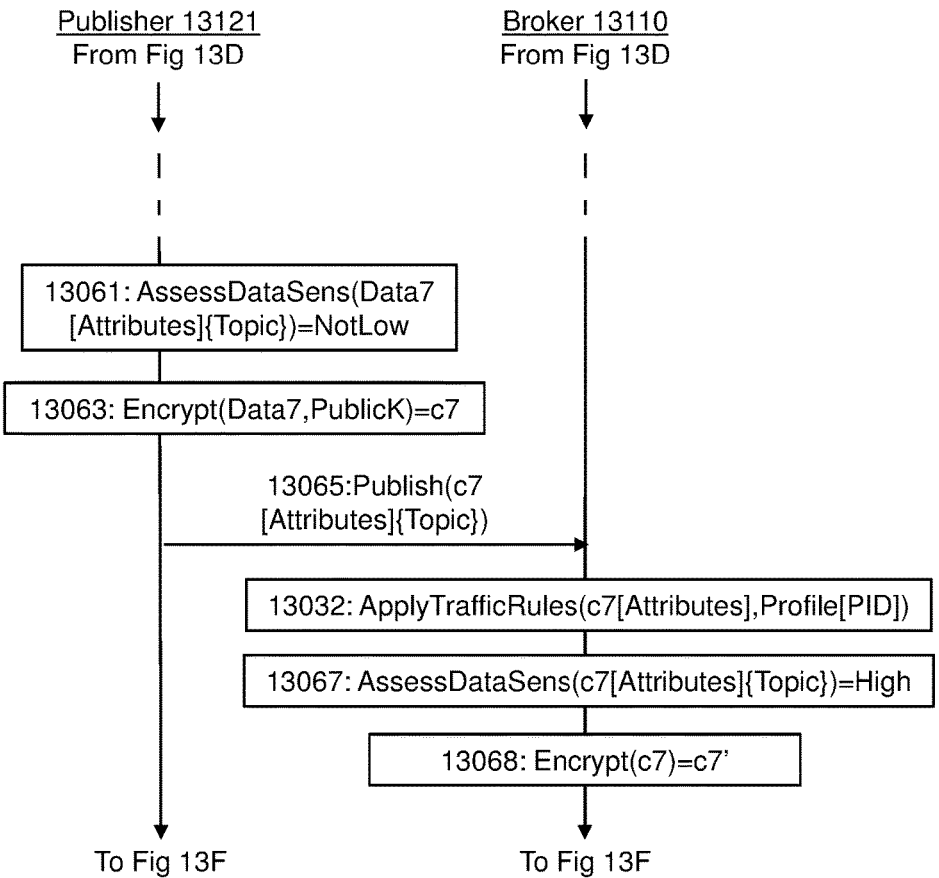
Figure 13F:
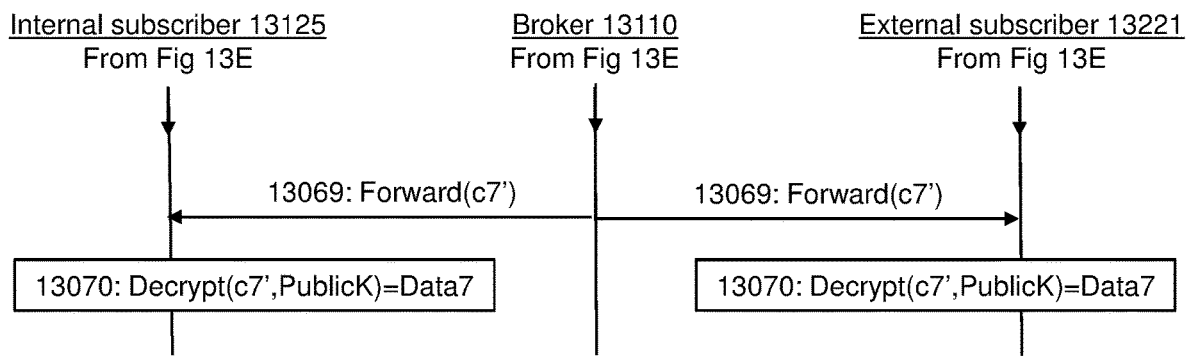

FIGS. 13E and 13F illustrate publication of high sensitivity data from the publisher 13121 to the internal and external subscribers 13125, 13221 via the broker 13110. The data is encrypted for transmission to the broker 13110 then double encrypted for forwarding on to the subscribers 13125, 13221. Steps 13061 to 13070 of FIGS. 13E and 13F respectively correspond to steps 5061 to 5070 of FIG. 5B. An additional step is included relative to FIG. 5B however; step 13032 is performed between steps 13065 and 13067 to confirm that the attributes of the data to be published conform to traffic rules in a similar manner to step 3032 of FIG. 3.

FIGS. 13A to 13F are included to demonstrate one example of how the techniques described separately above can be combined but other combinations are possible.

The invention claimed is:

1. A computer-implemented method for communicating data in a communications network comprising one or more publisher devices, a broker and one or more subscriber devices, the method comprising one of the publisher devices:

i-a. receiving a public key from the broker;
i-b. determining, based on one or more attributes of data to be published to the broker, whether a sensitivity level of the data is low or not low, wherein the sensitivity level of the data that is low is lower than the sensitivity level of the data that is not low; and
ii. following completion of both of steps i-a and i-b, publishing the data to the broker, wherein:
when step i-b results in a determination that the sensitivity level of the data is low, step ii comprises transmitting the data to the broker unencrypted; and
when step i-b results in a determination that the sensitivity level of the data is not low, step ii comprises encrypting the data then transmitting resulting encrypted data to the broker, wherein the step of encrypting the data comprises using the public key.

2. The method of claim 1, wherein the one or more attributes comprise one or both of:
a topic to which the data relates; and
an application from which the data originates.

3. The method of claim 1, wherein step i-b comprises categorising the data as having a sensitivity level selected from "low" and "not low";
said categorising optionally comprising:
allocating the data a sensitivity score; then
when the sensitivity score is below a predetermined low sensitivity threshold, categorising the data as having a sensitivity level of "low"; and
otherwise categorising the data as having a sensitivity level of "not low".

4. The method of claim 1, wherein the encrypted data comprises ciphertext and a hash signature, the step of encrypting the data comprising generating the hash signature by hashing one or more attributes of the one of the publisher devices with the ciphertext, wherein said one or more attributes of the one of the publisher devices constitute a publisher device profile accessible to the broker.

5. The method of claim 4, further comprising the broker receiving the encrypted data and verifying the signature by hashing the publisher device profile with the ciphertext and confirming that the result matches the signature received in the encrypted data.

6. The method of claim 1, wherein the step of encrypting the data is performed according to an attribute-based encryption, 'ABE', method.

7. The method of claim 1, wherein step i-b results in a determination that the sensitivity level of the data is not low, said method further comprising the broker:
iii-a. transmitting the public key to the one or more publisher devices and the one or more subscriber devices;
iii-b. registering the one of the publisher devices as a publisher of data so that the publisher device can publish data having one or more attributes, said one or more attributes comprising a topic to which the data relates;
iii-c. registering one of the subscriber devices as a subscriber of data relating to the topic;
iii-d. subsequent to step iii-a, receiving a publication request comprising the encrypted data transmitted by the publisher device in step ii, said encrypted data relating to that topic;
iii-e. determining, based on one or more of said attributes, whether a sensitivity level of the data is high or not high, wherein the sensitivity level of the data that is high is higher than the sensitivity level of the data that is not high; and iv. publishing the encrypted data to the one of the subscriber devices, wherein:
when step iii-e results in a determination that the sensitivity level of the data is not high, step iv comprises transmitting the encrypted data to the one of the subscriber devices; and
when step iii-e results in a determination that the sensitivity level of the data is high, step iv comprises encrypting the encrypted data to produce double-encrypted data, then transmitting the double-encrypted data to the one of the subscriber devices.

8. The method of claim 7, wherein the one or more attributes on which the determination of step iii-e are based comprise one or both of:
the topic to which the data relates; and
an application from which the data originates.

9. The method of claim 7, wherein step iii-e comprises categorising the data as having a sensitivity level selected from "high" and "not high";
said categorising optionally comprising:
allocating the data a sensitivity score; then
when the sensitivity score is above a predetermined high sensitivity threshold, categorising the data as having a sensitivity level of "high"; and
otherwise categorising the data as having a sensitivity level of "not high".

10. The method of claim 7, wherein the step of encrypting the encrypted data is performed according to an advanced encryption standard, 'AES', method.

11. The method of claim 7, wherein the step of encrypting is performed according to an elliptic curve cryptography, 'ECC', method.

12. The method of claim 7 as dependent thereon, further comprising the broker:
applying one or more traffic control rules to:
a profile of the one of the publisher devices, and
one or more of the attributes; then
determining whether the applied traffic rules are met for the publication request;
wherein step iv is performed only in response to determining that the one or more traffic control rules are met.

13. The method of claim 7, wherein step iii-c comprises the broker synchronising a counter or timer with the one of the subscriber devices according to a one-time password, 'OTP', protocol; the method further comprising the broker subsequently:
receiving an OTP request from the one of the subscriber devices to extend the subscription to an external device not comprised in the communications network, the communications network being a trusted communications network;
responsive thereto, generating a broker OTP according to the protocol;
responsive thereto, transmitting the broker OTP to the one of the subscriber devices; subsequently:
receiving a subscription request from the external device, said subscription request comprising an external device OTP;
responsive thereto, confirming that the broker OTP and the external device OTP match; and
responsive thereto, registering a subscription of the external device to publications relating to the topic.

14. The method of claim 13, wherein step iv further comprises transmitting the encrypted data to the external device.

15. The method of claim 14, wherein, whether step iii-e results in a determination that the sensitivity level of the data is high or not, step iv comprises encrypting the encrypted data to produce double-encrypted data, then transmitting the double-encrypted data to the external device.

16. The method of claim 13, wherein:
the OTP request comprises one or more attributes of the external device;
the subscription request comprises one or more attributes of the external device;
the method further comprising the broker confirming that the one or more attributes of the external device received in the OTP request match the one or more attributes of the external device received in the subscription request, wherein registering the subscription of the external device is further responsive to this confirmation.

17. The method of claim 13, wherein the OTP protocol uses either the hash-based message authentication codes, 'HMAC'-based OTP, 'HOTP', algorithm or the time-based OTP, 'TOTP', algorithm.

18. The publisher device of the communications network which also comprises the broker and the one or more subscriber devices, the publisher device being configured to perform the computer-implemented method of claim 1.

19. The communications network comprising the one or more publisher devices, the broker and the one or more subscriber devices, the communications network being configured to perform the computer-implemented method of claim 1.

20. The communications network of claim 19, configured to operate according to the Message Queuing Telemetry Transport, 'MQTT', protocol.

21. A computer program product comprising instructions which, when the program is executed by a computer, cause the computer to carry out the method of claim 1.

22. A non-transitory computer-readable data carrier having stored thereon a computer program which, when the program is executed by a computer, cause the computer to perform steps for communicating data in a communication network comprising one or more publisher devices, a broker and one or more subscriber devices, the steps comprising one of the publisher devices:
i-a. receiving a public key from the broker;
i-b. determining, based on one or more attributes of data to be published to the broker, whether a sensitivity level of the data is low or not low, wherein the sensitivity level of the data that is low is lower than the sensitivity level of the data that is not low; and
ii. following completion of both of steps i-a and i-b, publishing the data to the broker, wherein:
when step i-b results in a determination that the sensitivity level of the data is low, step ii comprises transmitting the data to the broker unencrypted; and
when step i-b results in a determination that the sensitivity level of the data is not low, step ii comprises encrypting the data then transmitting resulting encrypted data to the broker, wherein the step of encrypting the data comprises using the public key.

* * * * *